(12) United States Patent　　　　(10) Patent No.:　　US 12,623,741 B2

Killer　　　　　　　　　　　　　　(45) Date of Patent:　　May 12, 2026

(54) POSITIONALLY OPTIMIZED SADDLE DROPPER POST

(71) Applicant: Christopher James Killer, Costa Mesa, CA (US)

(72) Inventor: Christopher James Killer, Costa Mesa, CA (US)

(\*) Notice: Subject to any disclaimer, the term of this patent is extended or adjusted under 35 U.S.C. 154(b) by 917 days.

(21) Appl. No.: 17/659,955

(22) Filed: Apr. 20, 2022

(65) Prior Publication Data

US 2022/0355879 A1　　　Nov. 10, 2022

Related U.S. Application Data

(60) Provisional application No. 63/185,000, filed on May 6, 2021.

(51) Int. Cl.
_B62J 1/06_　　　　　(2006.01)

(52) U.S. Cl.
CPC ........................................ _B62J 1/06_ (2013.01)

(58) Field of Classification Search
CPC ....... B62J 1/06; B62J 1/28; B62J 1/08; B62K 3/04; B62K 19/36
See application file for complete search history.

(56) References Cited

U.S. PATENT DOCUMENTS

| | | | |
|---|---|---|---|
| 8,439,383 B2 * | 5/2013 | Talavasek | B62K 21/02 280/285 |
| 2010/0066054 A1 * | 3/2010 | Chen | B62K 15/008 280/278 |

| | | | |
|---|---|---|---|
| 2014/0265406 A1 * | 9/2014 | Huber | B62K 19/18 296/29 |
| 2021/0197922 A1 * | 7/2021 | Durrani | B62M 9/00 |

OTHER PUBLICATIONS

Amazon.com _ BikeGear Sports Tension Bar Bicycle Cross-Bar Adaptor Top Frame Telescopic Adaptor for Women and Kids Bikes _ Sports & Outdoors (Year: 2021).*
BikeYoke, "Aenomaly Announces SwitchGrade for BikeYoke Revive", http://www.aenomalyconstructs.com/, Vancouver BC, Canada, Mar. 28, 2022, 8pgs.
Enduro Mountainbike Magazine, "Long Term Test: Bionicon Edison EVO 2015 Final Review", www.enduro-mtb.com, 2022, 12 pgs.

(Continued)

_Primary Examiner_ — Jason D Shanske
_Assistant Examiner_ — Al-Birr Rahman Chowdhury
(74) _Attorney, Agent, or Firm_ — ONE LLP

(57)　　　　　　　ABSTRACT

A bicycle frame includes a front triangle comprising a head tube and a bottom bracket shell, a tension bar comprising a first end and a second end, wherein the first end of the tension bar is pivotably connected to an upper portion of a telescoping seat post assembly, and a first fore pivot assembly at a first reach point. The first reach point is between a reach point of the bottom bracket shell and a reach point of the head tube. The first fore pivot assembly is pivotably connected to the second end of the tension bar. The frame further includes an aft pivot assembly at a second reach point, wherein the second reach point is closer to the reach point of the bottom bracket shell than the first reach point, and wherein the aft pivot assembly is pivotably connected to a lower portion of the telescoping seat post assembly.

23 Claims, 16 Drawing Sheets

(56)  References Cited

OTHER PUBLICATIONS

Specialized Bicycle Components, "Specialized User Manual Command Post WU", Morgan Hill, CA, May 2017, 8 pgs.

"Setup Guide for Aenomaly SwitchGrade Post", https://www.aenomalyconstructs.com/pages/how-to-setup-and-operate-your-switchgrade, 1 pg.

Art's Cyclery, "The Trail Snob: When Bad Ideas Are a Good Thing", San Luis Obispo, CA, 2022, 7 pgs.

* cited by examiner

| Dropper extension (mm) | Single Pivot | Linkage 1 | Linkage 2 | Regular Frame |
|---|---|---|---|---|
| 0 | 72.1 | 73.2 | 73.2 | 78.4 |
| 20 | 72.6 | 73.2 | 72.7 | 78.18 |
| 40 | 73.1 | 73.4 | 72.8 | 77.96 |
| 60 | 73.6 | 73.8 | 73.2 | 77.74 |
| 80 | 74.2 | 74.3 | 73.8 | 77.52 |
| 100 | 74.7 | 74.9 | 74.5 | 77.3 |
| 120 | 75.3 | 75.6 | 75.2 | 77.08 |
| 140 | 75.9 | 76.4 | 76.1 | 76.86 |
| 160 | 76.6 | 77.2 | 77.1 | 76.64 |
| 180 | 77.2 | 78.1 | 78.4 | 76.42 |
| 200 | 78 | 79.1 | 80.5 | 76.2 |

901  903  905  907

POSITIONALLY OPTIMIZED SADDLE DROPPER POST

CROSS-REFERENCE TO RELATED APPLICATION AND CLAIM OF PRIORITY

This application claims priority under 35 U.S.C. § 119(e) to U.S. Provisional Patent Application No. 63/185,000 filed on May 26, 2021, the contents of which are incorporated by reference as if fully set forth herein.

TECHNICAL FIELD

This disclosure relates to bicycles, and in particular, bicycles for riding off-road, such as mountain bikes, fat bikes and certain cyclo-cross or gravel bikes. More specifically, the present disclosure is directed to embodiments of a positionally optimized saddle dropper post.

BACKGROUND

Bicycles for primarily off-road use, including, without limitation, mountain bikes, fat bikes, and certain cross, or gravel bikes have evolved significantly since the first bicycles referred to as mountain bikes were sold in the late 1970s. Improvements in geometry, componentry, suspension, and tires have produced bicycles which are lighter, maintain traction, and more readily absorb than previous generations of bicycles. As such, modern off-road bicycles are highly capable and can typically climb, descend, and negotiate technical terrain better much better than older bikes.

Dropper seat posts, typically comprising an upper half attached to the bicycle's saddle and a lower half, retained in a frame's seat tube, which allow the extension of the seat post to be adjusted on the fly, have contributed significantly to the modern bikes' ability to negotiate a wide variety of terrains and riding conditions. For example, a dropper seat post allows a rider to compress the seat post before descents and technical sections to a position closer to the top tube, thereby reducing the extent to which the saddle hinders the rider's ability to move her weight back and forth, as well as up and down. At the same time, a dropper seat post may be extended before climbing and sprinting such that the saddle is located further away from the bottom bracket, thereby supporting the rider's weight, and allowing for fuller leg extension when pedaling. Dropper seat posts in which an upper half telescopes relative to a lower half also provide the practical benefits of being simple to manufacture and service, relatively lightweight, and can be retrofitted to older frames.

However, extending a dropper seat post along a single axis of reciprocation typically decreases the effective seat tube angle of the bicycle, while at the same time, maintaining the same saddle pitch across seat heights. This presents several recognized biomechanical problems, particularly when the dropper post is fully extended. First, while there are several models for optimizing a rider's seat position for pedaling efficiency, there is a general consensus that optimum pedaling efficiency at a full seat height is typically maximized when the seat is positioned such that a rider's front knee and front pedal are vertical when the pedals are horizontal. In other words, pedaling efficiency is maximized when, at the point of the pedal stroke where maximum force is applied by the rider's foot, the force applied by the rider is perfectly normal to the lever arm between the pedal and the bottom bracket. Further, pedaling efficiency is also maximized when the rider's center of mass is, to the extent possible, directly above the downstroke of the pedal. For this reason, track, triathlon, and other bicycles designed to efficiently translate the pedaling power of a rider in a "high" riding position where a rider can apply maximum force to a pedal have steep seat tube angles, typically between 78-80 degrees. Second, in addition to maximizing pedaling efficiency, maintaining perpendicularity between a rider's front knee and the front pedal at point of maximum power minimizes the incidence of knee pain arising from the rider applying full pedaling force obliquely to the lever arm of the pedal. For this reason, comfort, hybrid, and other bicycles designed around the expectation of a low saddle position have comparatively "slack" seat tube angles, of around 72 degrees or less. Third, raising the saddle height without decreasing saddle pitch (i.e., the angle of the saddle relative to the bicycle) increases the amount of rider weight placed on the forward, narrower portion of the saddle, which can, in mild cases, cause rider discomfort, and in more severe cases, can damage riders' reproductive health.

In contrast to time trial and comfort bicycles, whose geometry has a single performance objective, such as maximizing efficient power transfer or maximizing rider comfort, the geometry of modern off-road bicycles represents a compromise between multiple diverse performance objectives and design considerations. For example, to improve control when descending on bumpy terrain, modern mountain bicycles have "long and slack" frame geometries, typically characterized by longer wheelbases, larger wheels (i.e., 29" wheels, as opposed to 27.5" or 26" wheels) slacker (i.e., shallower) head tube angles and more suspension travel than previous generations of trail bikes and other mountain bikes intended for applications other than downhill racing. However, balancing "long and slack" frame geometry with the competing needs for balanced weight distribution for seated riders (i.e., to keep the bicycle from having unresponsive or imprecise handling and compromised pedaling efficiency) and clearance between the rear tire and seat post, typically necessitates a steep (for example, between 78-80 degrees for full suspension bicycles with 180 mm of front and rear travel). Accordingly, the combination of modern frame geometry with dropper posts results in bicycles where the rider is seldom, if ever, in the optimum riding position for a given seat height. Specifically, where the seat post is not sufficiently forward at full extension, the rider's knee is not positioned correctly relative to the pedal spindle. For professional and elite riders, a sub-optimal saddle position translates to a loss of pedaling efficiency and by implication, overall performance. For recreational riders, sustained riding in a less-than-ideal position presents a heightened risk of knee pain and injury to other parts of the body. Additionally, with dropper posts that do not provide any fore-aft adjustment, the rider's center of mass may alternately be too far forward or backwards at lower saddle heights, reducing traction and/or control of the bicycle.

Thus, designing bicycle frames and dropper seat posts which provide a biomechanically correct seat tube angle and saddle pitch across a range of seat heights remains a source of technical challenges and opportunities for improvement in the art.

SUMMARY

This disclosure provides a positionally optimized saddle dropper post and a bicycle frame for implementing same.

In a first embodiment, a bicycle frame includes a front triangle comprising a head tube and a bottom bracket shell, a tension bar comprising a first end and a second end, wherein the first end of the tension bar is pivotably connected to an upper portion of a telescoping seat post assembly, and a first fore pivot assembly at a first reach point. The first reach point is between a reach point of the bottom bracket shell and a reach point of the head tube. The first fore pivot assembly is pivotably connected to the second end of the tension bar. The frame further includes an aft pivot assembly at a second reach point, wherein the second reach point is closer to the reach point of the bottom bracket shell than the first reach point, and wherein the aft pivot assembly is pivotably connected to a lower portion of the telescoping seat post assembly.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 1 illustrates a non-limiting example of a biomechanical challenge addressed by certain embodiments according to this disclosure;

FIGS. 9A and 9B illustrate examples of varyingly progressive effective seat tube angles provided by certain embodiments according to this disclosure.

DETAILED DESCRIPTION

Figure 2A:
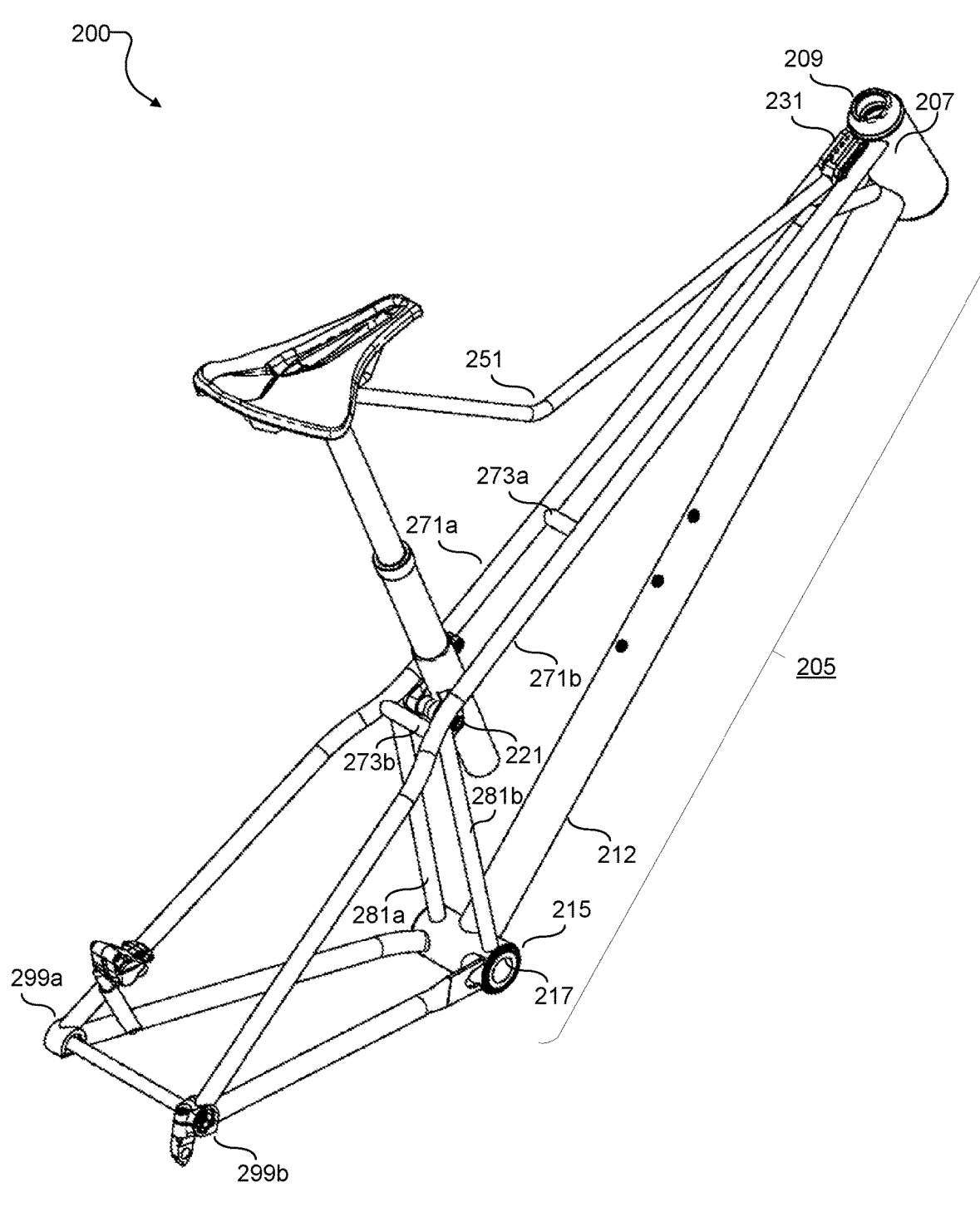
FIGS. 2A-2D illustrate an example of a bicycle frame according to various embodiments of this disclosure.

FIGS. 1 through 9B, discussed below, and the various embodiments used to describe the principles of this disclosure in this patent document are by way of illustration only and should not be construed in any way to limit the scope of the disclosure. For convenience of cross-reference, elements common to more than one figure are numbered similarly.

Figure 1:
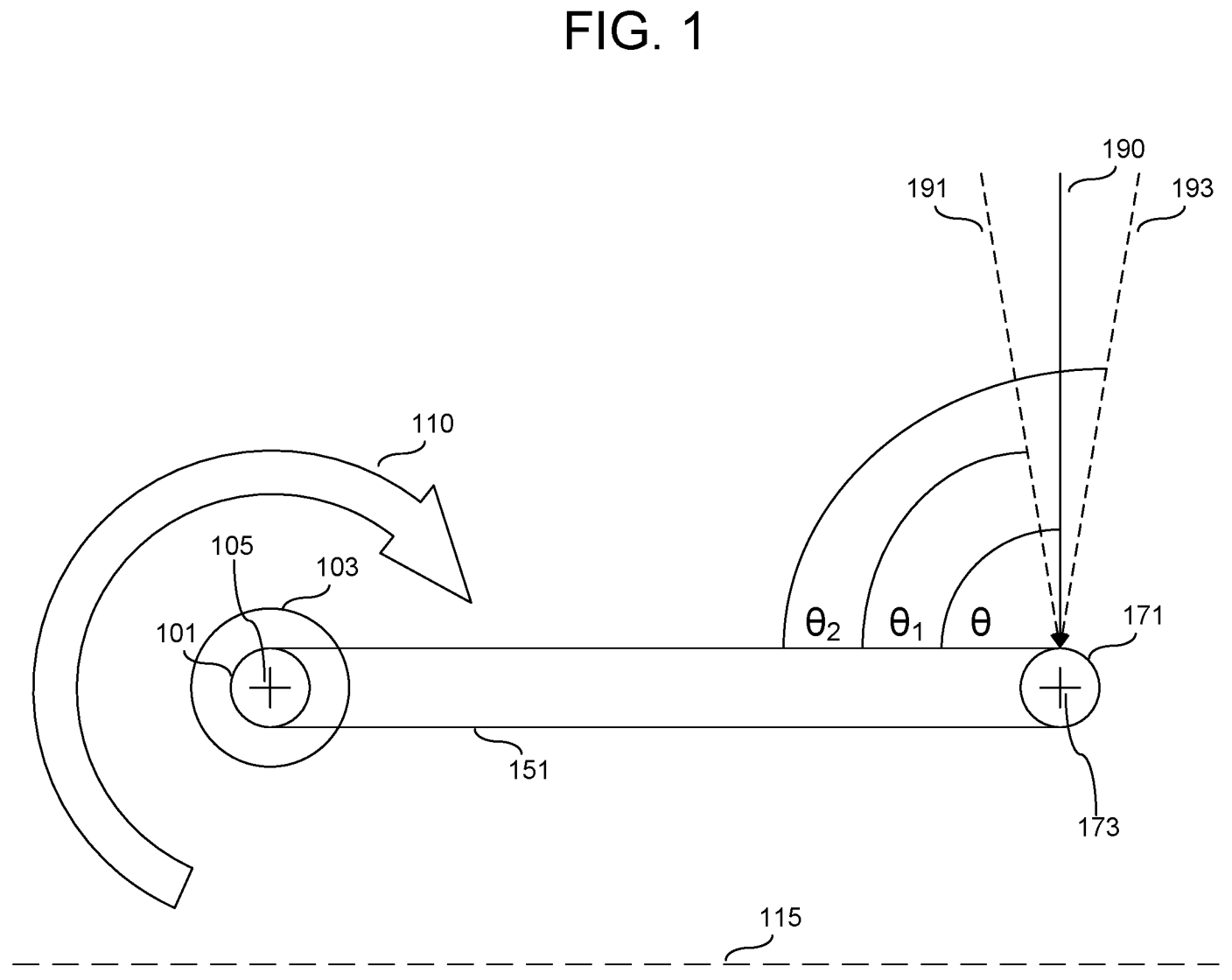

FIG. 1 is a diagram providing context and background as to one of the technical problems addressed by certain embodiments according to this disclosure.

Referring to the illustrative example of FIG. 1, a simplified representation of a bottom bracket 101, a crank 151 and pedal spindle 171 are provided in the figure. Bottom bracket 101 comprises one or more bearings housed within a bottom bracket shell 103 of a bicycle frame. Bottom bracket 101 retains an axle rotatably connected to a first end of crank 151, wherein the axle rotates within bottom bracket 101 around a first axis of rotation 105. Referring to the illustrative example of FIG. 1, crank 151 comprises a section of rigid material (for example, aluminum, steel, carbon fiber or titanium) connected at a first end to the axle retained by bottom bracket 101, and connected at a second end to a pedal spindle 171. Depending on the crankset design, either crank 151 or the axle retained by bottom bracket 101 is connected to a drivetrain, typically by one or more chainrings attached to either the axle or crank 151. However, embodiments according to the present disclosure may be practiced with any type of bicycle drivetrain comprising a bottom bracket and premised on rotational pedaling known in the art. Examples of drivetrains compatible with the present disclosure include, without limitation, chain-driven drivetrains, belt-driven drivetrains, shaft driven drivetrains, and also geared drivetrains that utilize a rear derailleur, hub gear or gearbox (for example, Pinion or Rohloff drivetrains) as well as electric-assist versions of the above-described drivetrains.

Pedal spindle 171 comprises an axle of rigid material (typically, aluminum, steel or titanium) which is rotatably connected to a pedal platform (omitted from the figure for clarity). The pedal platform may be a clipless or flat (i.e., not holding a rider's foot to the pedal platform on the pedal upstroke) platform.

As shown in FIG. 1, a rider applies force to crank 151 through pedal spindle 171, causing crank 151 and the axle to rotate around first axis of rotation 105 in a first direction 110. For upright (i.e., non-recumbent) bicycles suitable for off-road use, the rider exerts maximum pedaling force when crank 151 is at or around the 3:00 o'clock position, or parallel with the horizontal plane 115. The rider's pedaling force upon pedal spindle may be expressed as a force vector 190, whose magnitude corresponds to the amount of pressure exerted by the rider upon the pedal and whose direction generally corresponds to a line connecting an axis of rotation 173 of the pedal platform.

The angle between force vector 190 and the crank arm may be expressed as an angle, θ. Optimally, when the saddle is at full height, and crank 151 is horizontal, the value of θ is 90 degrees, with all the rider's downward pressure on the pedal being translated into torque around first axis of rotation 105.

In bicycles with static seat posts (for example, road bikes, track bikes, and triathlon/time trial bicycles), in which the saddle height, pitch and fore-aft position does not change during operation, a rider can relatively easily adjust their saddle position (for example, in by sitting on their bicycle in front of a mirror, or with the aid of a bike fitter) to achieve a biomechanically optimum seat position, where θ is 90 degrees when crank 151 is in a forward, level position.

However, in bicycles with a dropper post extending and compressing along a straight line, the effective seat tube angle (as used in this disclosure, the expression "effective seat tube angle" encompasses the angle between a line drawn from the center of the bottom bracket to a point at the center of the seat post at the height of the seat surface and a line drawn parallel to the ground) remains constant or, more typically (especially for full-suspension bikes), decreases as the dropper seat post is extended to a higher saddle position. In either case, as the dropper seat post extends, the saddle moves linearly upwards and rearwards, causing the position of the rider's knee relative to the pedal spindle to move backwards as the dropper seat post moves upwards.

Returning to the explanatory example of FIG. 1, where a dropper seat post moves the seat along a linear path, when the seat post is fully compressed, the rider's knee may be forward of pedal spindle 171 when crank 151 is level, with the rider's pedaling force applied along a non-perpendicular force vector 191 at an angle $\theta_1$ relative to crank 151. Similarly, in the example of FIG. 1, when the seat post is fully extended, the rider's knee moves backwards to a position behind pedal spindle 171 when crank 151 is level, with the rider's pedaling force applied along a second non-perpendicular vector 193 at angle $\theta_2$ relative to crank 151. Because vectors 191 and 193 are not perfectly normal to crank 151, not all the force applied by the rider is converted to torque upon first point of rotation 105. Instead, a component of the applied force, whose magnitude is proportional to the cosine of the angle between the force vector of the rider's pedaling force and crank 151 is applied in a direction parallel to crank 151. From an efficiency standpoint, this is undesirable, in that not all the force the rider applies at the pedal is converted to torque at the drivetrain. From a biomechanical standpoint, the non-normal component of the force on the crank translates to stress upon the rider's leg joints, most typically the knee. Depending on the rider and magnitude of the non-normal component of the force applied to the pedals, this stress on the leg joints can produce knee pain or joint injury.

As FIG. 1 shows, where a dropper post moves along a purely linear path between full compression and full extension, the rider's knee is in a biomechanically optimum position relative to the pedal spindle for only a small portion at the top of the seat post's travel. Further, as increasingly longer dropper posts (for example, dropper posts with 180+ mm of travel) become the norm, the fore-aft travel of the rider's knee increases, along with the difference between θ1 and θ2, between full compression and full extension.

Additionally, when the rider moves backwards as the saddle moves upwards, the rider's seated riding position may be too far forward at lower saddle heights, resulting in an improper distribution of weight between the front and rear wheels. Ideally, during steady, seated pedaling in a straight line and unpowered descending in a straight line, the rider's weight is divided equally between the front and rear wheels. However, where the saddle moves forward as the dropper seat post compresses, the rider must adjust their seating position on the saddle backwards to achieve a proper weight distribution. In such cases, the rider is forced to choose between imperfect weight distribution or moving forward or backwards on the saddle, which presents short-term discomfort and can be harmful in the long term.

FIGS. 2A-2E (collectively, "FIG. 2") illustrate five views of an example frame 200 and dropper seat post according to various embodiments of this disclosure. For convenience of cross-reference, elements common to more than one of FIGS. 2A through 2E are numbered similarly.

Referring to the explanatory embodiment of FIG. 2, frame 200 comprises a front triangle 205. Recognizing the wide variety of mountain bike frame designs, including without limitation, hardtail (i.e., no rear suspension), full suspension frames with fixed bottom brackets (for example, single pivot and virtual pivot point suspension frames), full suspension frames permitting limited movement of the bottom bracket (for example, unified rear triangle frames) and frames manufactured as monocoque bodies without discrete tubes the expression "front triangle," as used in this disclosure encompasses structures connecting a head tube and a bottom bracket.

In the illustrative example of FIG. 2, front triangle 205 comprises head tube 207, which is a hollow section (typically a tapered tube) retaining upper and lower bearings of a headset 209, which is rotatably connected to the steerer tube of the bicycle's fork. The centerline 211 through the axes of rotation of the upper and lower headset bearings defines the axis of rotation of the fork steerer tube, as well as the head tube angle $\theta_{head}$ of the bicycle, which along with the effective seat tube angle, can be a significant determinant of the bicycle's handling characteristics, particularly when a rider is in a seated riding position.

According to various embodiments, front triangle 205 further comprises bottom bracket shell 215, which is a hollow section (often, but not always a section of steel, aluminum, or carbon fiber tubing) which is rotatably connected to a crankset (for example, a crankset comprising crank 151 in FIG. 1) through a bottom bracket 217. According to various embodiments, bottom bracket 217 comprises one or more (typically, two, though single bearing bottom brackets have been made) bearings retained within bottom bracket shell 215, which are designed to permit the rotation of the cranks, even under the significant torsional and linear loads associated with hard pedaling, cornering, or negotiating jumps and drops. Depending on embodiments, bottom bracket 217 may have a smooth or threaded exterior portion configured to mate with a complementary interior surface of bottom bracket shell 215.

Bottom bracket shell 215 is connected to head tube 207 through front triangle 205. In the non-limiting example of FIG. 2, bottom bracket shell 215 is directly connected to head tube 207 through a single down tube 212. However, bottom bracket shell 215 may be connected to head tube 207 through a wide variety of alternatives to the tubular frame construction shown in FIG. 2. Further examples of suitable frame architectures by which bottom bracket shell 215 may be connected to head tube 207 include, without limitation, through a y-frame replacing a traditional top-seat-down tube triangle (for example, the Specialized FSR line of bicycles), through a seat tube and top tube (for example, folding bikes without a downtube), or through a single section acting as top tube, seat tube, downtube and head tube (for example, certain carbon fiber observed trials bicycles).

Frame 200 further comprises a first fore pivot assembly 231 located at a first reach point, shown as R(f1) in FIG. 2. As used in this disclosure, the expression "reach point" refers to a coordinate along an axis 233 parallel to a line through the front and rear axles of the bicycle. In this disclosure, where a first reach point is said to be "closer to," "between" or otherwise described in spatial relation to a second reach point, it should be understood, that only a spatial relationship along axis 233 is being described. According to various embodiments, R(f1) is between the reach point of the bottom bracket shell (R(bb)) and the reach point of head tube (R(ht)).

In the illustrative example of FIG. 2, first fore pivot assembly 231 comprises a structure on front triangle 205 which is pivotably connected to a second end 253 of a tension bar 251. Depending on the geometry of the frame, first fore pivot assembly 231 may be connected to head tube 207 at one or more top tubes (for example, top stays 271a and 271b of top tube assembly 271 in FIG. 2), or other mounting point on front triangle 205. In certain embodiments, for example, embodiments with a crossing down tube (such as used on SE Bikes' Quad Series frames) first fore pivot assembly 231 may be mounted on a down tube.

In certain embodiments, first fore pivot assembly 231 comprises a clevis bracket comprising a u-shaped section of material with two parallel sides with one or mating pairs of holes proportioned to accommodate a clevis pin. In some embodiments, the clevis pin may be a press-fit pin, or a pin utilizing a snap ring or circlip. In various embodiments, the clevis pin comprises a smooth portion providing a surface upon which the tension bar can rotate and a threaded end which threads into first fore pivot assembly 231. In this way, the clevis pin can be removed and replaced for repairs and adjustments trailside. In various embodiments, first fore pivot assembly 231 comprises one or more bushings or bearings attached to front triangle 205 (for example, at a top tube of the front triangle) configured to pivotably retain an axle connected to second end 253 of tension bar 251. In embodiments in which first fore pivot assembly 231 pivotably connects with second end 253 of tension bar 251 through a clevis pin, axle or other rotational structure, first fore pivot assembly 231 may include one or more of a tension spring or bushing on the clevis pin or axle to minimize rattle during heavy use. In certain embodiments, tension bar 251 may be integral with front triangle 205, and first fore pivot assembly 231 comprises a region of material of high flexibility, such as a thin, substantially flat section of carbon fiber, such as used in "flex-stay" rear suspension designs in which a flexible section of material replaces a bearing or other rotational pivot component.

Referring to the illustrative example of FIG. 2, tension bar 251 comprises a section of substantially rigid material (for example, aluminum, steel, carbon fiber or titanium tubing) with a first end 252 and a second end 253. In some embodiments, to improve stand-over clearance, tension bar 251 comprises one or more bends 255. In some embodiments, tension bar 251 may curve along some or all its length. In certain embodiments, the distance between first end 252 and second end 253 may be adjustable, for example, by making tension bar 251 a multi-part structure in which two or more sections of material telescope relative to one another and can be locked into different positions. Depending on embodiments, making the length of tension bar 251 adjustable may enhance fine-tuning of the kinematics by which the effective seat angle and reach point of the saddle change in response to extending and compressing the dropper seat post.

As previously noted, second end 253 of tension bar 251 is pivotably connected to a first pivot assembly 231, and first end 252 of tension bar 251 is pivotably connected to an upper portion 261 of a telescoping seat post assembly 260. According to various embodiments, telescoping seat post assembly 260 comprises an upper portion 261 and a lower portion 262. Lower portion 262 comprises a hollow section of material (typically an aluminum tube sealed at a lower end) which is pivotably connected to frame 200 through aft pivot assembly 221. Upper portion 261 comprises a second hollow section of material (again, typically a section of aluminum tubing) proportioned to slide along an interior surface or exterior surface of lower portion 262. A damped spring (for example, a gas or coil spring with a hydraulic or pneumatic damper) with remotely actuated (for example, through a cable, hydraulic line or electronically) release is disposed within the interior of upper portion 261 and lower portion 262. When the release is actuated, upper portion 261 is free to move telescopically relative to lower portion 262. For example, if a rider applies her weight to saddle 263 while the release is engaged, telescoping seat post assembly compresses under the force of her weight, moving upper portion 261 closer to bottom bracket shell 215. Similarly, if the rider raises the seat points of her body while the release is engaged, the damped spring pushes upper portion 261 away from lower portion 262, causing upper portion 261 to extend and put saddle 263 in a higher seat position. The rider can lock saddle 263 into a new height by disengaging the release.

Referring to the explanatory example of FIG. 2, first end 252 of tension bar 251 is pivotably connected to upper portion 261 of telescoping seat post assembly 260. In certain embodiments, tension bar 251 is directly connected to upper portion 261 (for example, through a clamp or braze-on on exterior of a surface which slides in or over lower portion 262. In some embodiments (for example, where mounting a pivot would interfere with, or reduce, the travel of telescoping seat post assembly 260, first end 252 of tension bar 251 may be indirectly pivotably connected to upper portion 261, connecting through a pivot disposed on a saddle clamp, or a portion of saddle 263 (for example, to the saddle rails).

In some embodiments, tension bar 251 is pivotably connected to upper portion 261 of telescoping seat post assembly 260 through an axle-based connection (for example, through a clevis on either tension bar 251 or upper portion 261 configured to accommodate a clevis rod end on either tension bar 251 or upper portion 261, and to pivot on a clevis pin running through the clevis and clevis rod end). In some embodiments, tension bar 251 is pivotably connected to upper portion 261 through a section of flexible material (for example, a thin section of carbon fiber) integral with upper portion 261, saddle 263 or a saddle clamp connecting upper portion 261 to saddle 263.

As shown in the explanatory example of FIG. 2, frame 200 comprises an aft pivot assembly 221, which is located at a reach point (R(ap)) which, when measured along axis 233, is closer to the reach point (R(bb)) of the bottom bracket than the reach point R(f1) of the first fore pivot point. The lower portion 262 of telescoping seat post assembly 260 is pivotably connected to frame 200 through aft pivot assembly 221. According to various embodiments, aft pivot assembly 221 allows lower portion 262 to pivot across a 15-30 degree or less range of motion between the slackest effective seat tube angle obtained when telescoping seat post assembly 260 is fully compressed, and the steepest effective seat tube angle obtained when telescoping seat post assembly 260 is fully extended. In certain embodiments, the range of rotational motion provided by aft pivot assembly 221 may be a function of the travel length (as used herein with respect to telescoping seat post assembly 260, the expression "travel" encompasses the difference in the length of telescoping seat post assembly between its fully compressed and fully extended positions).

Given the finite range of angular motion of aft pivot assembly 221, the present disclosure contemplates a wide range of pivot systems and structures by which lower portion 262 of telescoping seat post assembly 260 may be pivotably connected to aft pivot assembly 221. According to certain embodiments, aft pivot assembly 221 comprises a tube 265 with an interior diameter proportioned to accommodate the exterior diameter of lower portion 262 of telescoping seat post assembly 260 and a clamp for compressing the tube to retain lower portion 262 of telescoping seat post assembly 260. According to various embodiments, the exterior of tube 265 comprises a clevis bracket, clevis rod end, or hollow boss through which a clevis pin or axle about which lower portion 262 pivots.

In some embodiments, aft pivot assembly 221 comprises a clevis bracket attached to frame 200 at a location with a reach point R(ap) closer to the reach point of the bottom bracket (R(bb)) than the reach point of the first fore pivot assembly (R(f1)). While in the explanatory example of FIG. 2, R(ap) is shown as having a reach point closer to that of the rear axle (R(rx)) than the reach point of the bottom bracket shell (R(bb)), embodiments according to this disclosure, and include embodiments wherein R(ap) and R(bb) are the same, or where R(bb) is closer to R(rx) than R(ap) (i.e., where the reach point of aft pivot assembly 221 is in line with that of bottom bracket shell 215, or forward of the bottom bracket).

In various embodiments, aft pivot assembly comprises one or more bushings or bearings disposed on frame 200, through which an axle also passing through a hollow protrusion (for example, a hollow boss) on lower portion 262 passes. Referring to the explanatory example of FIG. 2, the bearings of aft pivot assembly 221 are mounted to the first and second top stays (271a and 271b) of top tube assembly 271. Further, in some embodiments, aft pivot assembly 221 may be connected to the first and second tubes 281a and 281b of a seat tube assembly 281.

In some embodiments, one or more components of lower portion 262, frame 200 and aft pivot assembly 221 may be made integral with one another. For example, in some embodiments, tube 265 and a separate clamp for lower portion 262 of telescoping seat post assembly 260 may be omitted, and a hollow boss or other hardware for pivotably connecting lower portion 262 to aft pivot assembly 221 may instead be mounted directly on lower portion 262. Similarly, in certain embodiments, instead of rotational connection points (for example, axles, and bushings or bearings) aft pivot assembly 221 connects lower portion 262 to frame 200 through a section of flexible material.

In various embodiments, aft pivot assembly 221 includes one or more adjustable stops (sometimes referred to in the art as "knock blocks") configured to confine the range of angles over which lower portion 262 may pivot. Depending on the geometry and configuration of frame 200 (for example, in smaller, full-suspension frames, or long-travel full suspension frames), setting hard limits on the range of angular range of motion may prevent unwanted contact between lower portion 262 and other components of the bicycle, such as the rear tire, rear triangle, rear shock or linkage(s) between the rear shock and rear triangle.

FIG. 2 illustrates a non-limiting example of a frame architecture according to this disclosure. As noted elsewhere in this disclosure, modern fabrication and design techniques permit a wide variety of bicycle frame architectures beyond the traditional "double triangle" geometry associated with unsuspended or front-suspension only frames made from joined sections of tube. The embodiments described with reference to FIG. 2 are intended to be illustrative, rather than limitative of the scope of this disclosure.

Referring to the explanatory example of FIG. 2, frame 200 comprises a top tube assembly 271 comprising a first top stay 271a and a second top stay 271b. According to certain embodiments, first top stay 271a comprises a first section of material (for example, steel, titanium, carbon fiber or aluminum), connected at a first end to head tube 207 and at a second end to brake-side rear dropout 299a. In this explanatory example, second top stay 271b comprises a second section of material (for example, steel, titanium, carbon fiber or aluminum) connected at a first end to head tube 207, and at a second end to drive-side rear dropout 299b. In this example, top tube assembly 271 further comprises a first brace 273a and a second brace 273b connecting first top stay 271a and second top stay 271b.

Figure 2B:
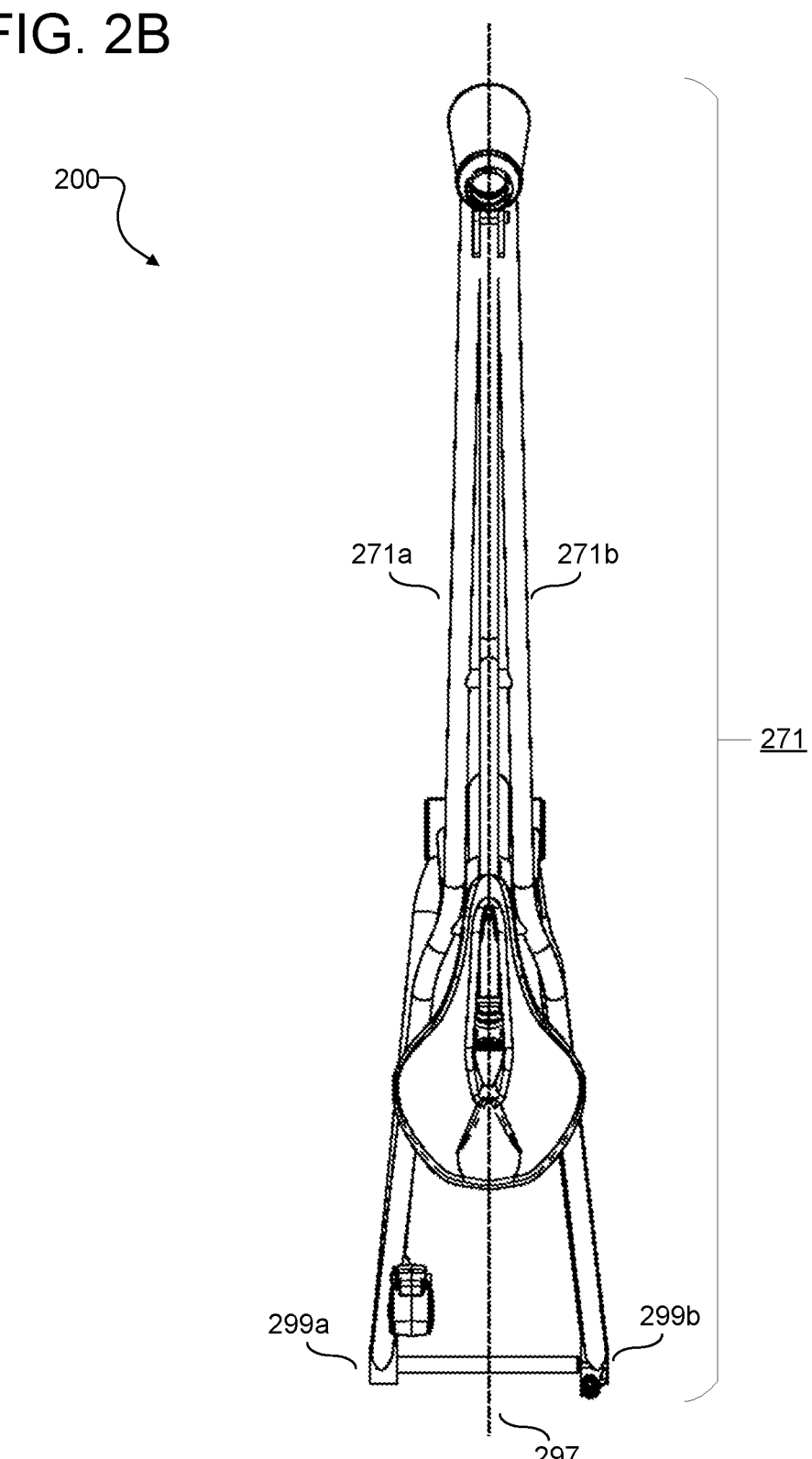
Figure 2C:
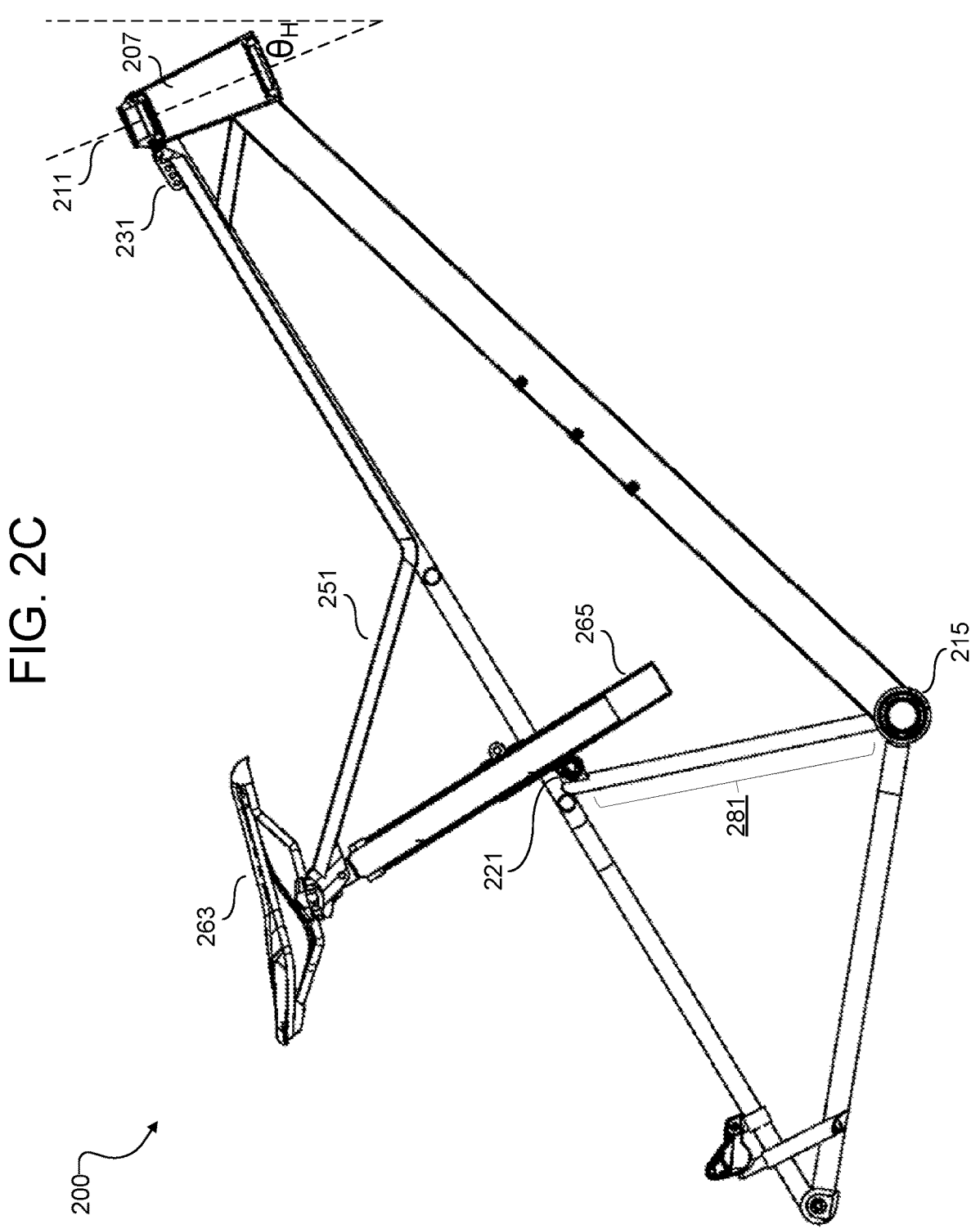
Figure 2D:
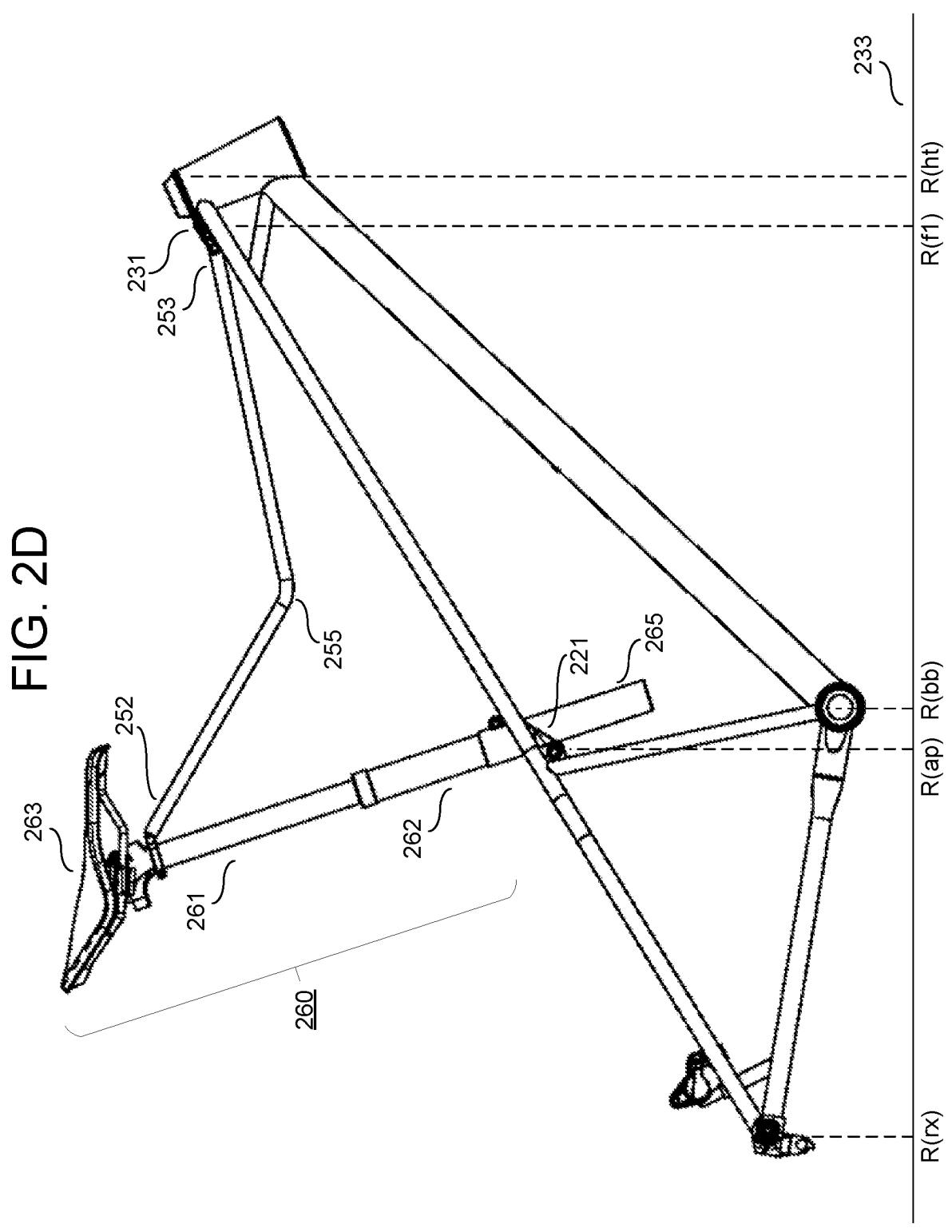

As shown, for example, in FIG. 2B, first top stay 271a and second top stay 271b are disposed on opposite sides of fore-aft centerline 297, creating one or more open spaces (i.e., spaces without any tubing) in which fore-aft centerline 297 is exposed proximate to aft pivot assembly 221, providing space in which telescoping seat post assembly can pivot without contacting the top tube. While FIG. 2 describes embodiments wherein top tube assembly 271 comprises a symmetrical pair of top stays straddling telescoping seat post assembly 260, embodiments according to this disclosure are not so limited, and encompass embodiments comprising an asymmetric top tube assembly in which fore-aft centerline 297 is exposed proximate to aft pivot assembly 221. Additionally, or alternatively, in some embodiments according to this disclosure, top tube assembly 271 may comprise a section of material (for example, a tube) with a hole or fork exposing fore-aft centerline 297 proximate to fore-aft centerline 297. In some embodiments, frame 200 is a full-suspension frame, and top tube assembly 271 terminates near aft pivot assembly 221.

As shown in the illustrative example of FIG. 2, in some embodiments, frame 200 further comprises a seat tube assembly 281. As used in this disclosure, the expression "seat tube assembly" encompasses a structure linking bottom bracket shell 215 with a top tube assembly 271, and, as used in this disclosure, the expression "seat tube assembly" does not connote any requirement that a seat post can be inserted into seat tube assembly. As shown in FIG. 2, seat tube assembly 281 comprises a first tube 281a and a second tube 281b connecting bottom bracket shell 215 with top tube assembly 271. As shown in FIG. 2, first tube 281a and second tube 281b are disposed on opposing sides of fore aft centerline 297, thereby exposing fore-aft centerline 297 proximate to aft pivot assembly 221 and providing room for lower portion 262 of telescoping seat tube assembly 260 to pivot and swing.

Because telescoping seat post assembly 260 is pivotably connected to aft pivot assembly 221, the effective seat tube angle of frame 200 is not related to the angle of seat tube assembly 281, seat tube assembly 281 may be made steeper or brought forward relative to bottom bracket shell, thereby increasing the clearance between the rear wheel and seat tube assembly 281, relative to a "normal" frame, in which the seat post is disposed within a single seat tube. From a design standpoint, the additional clearance provided by certain embodiments according to this disclosure may be particularly advantageous—for example, in smaller-framed bicycles using 29" tires, or long-travel full suspension bicycles in smaller frame sizes.

FIGS. 3A-3D (collectively, "FIG. 3") illustrate aspects of the kinematics of an example frame and telescoping dropper post according to various embodiments of this disclosure. To avoid repetition and facilitate cross reference, elements common to FIGS. 2 and 3 are numbered similarly.

As noted elsewhere in this disclosure, in "normal" bicycle frames, where a telescoping seat post is retained in a backwards-tilting seat post or other structure maintained at a fixed angle relative to the head tube, the saddle moves backwards relative to the bottom bracket as the seat post extends upwards and forwards as the seat post compresses. From a biomechanical and performance standpoint, the above-described motion of the saddle in response to compression and extension of the telescoping seat post is undesirable for at least the following reasons. First, when the saddle is fully extended for climbing or sprinting, there is a higher likelihood of the rider having to pull on the handlebars to balance out a backward force from the cranks at the top of the pedal stroke, which diminishes pedaling efficiency and can produce knee pain. Second, because the rider moves forwards as the post descends, the rider's center of gravity is necessarily not centered over the bottom bracket shell for a substantial portion of the seat post's travel. For example, if the rider's center of gravity is correctly positioned over the bottom bracket when the seat post is fully compressed, then her center of gravity will be substantially behind the bottom bracket when the seat post is fully extended, resulting in awkwardly slow, or "floppy" handling and a higher incidence of the front wheel lifting under power. However, if the rider's center of gravity is correctly positioned over the bottom bracket at the top of the seat post's travel, the rider will be substantially forward of the center of gravity when the saddle is compressed, which may result in awkwardly fast, or "squirrely" handling and a higher incidence of the rider pitching over the handlebars during braking due to the weight imbalance.

Figure 3A:
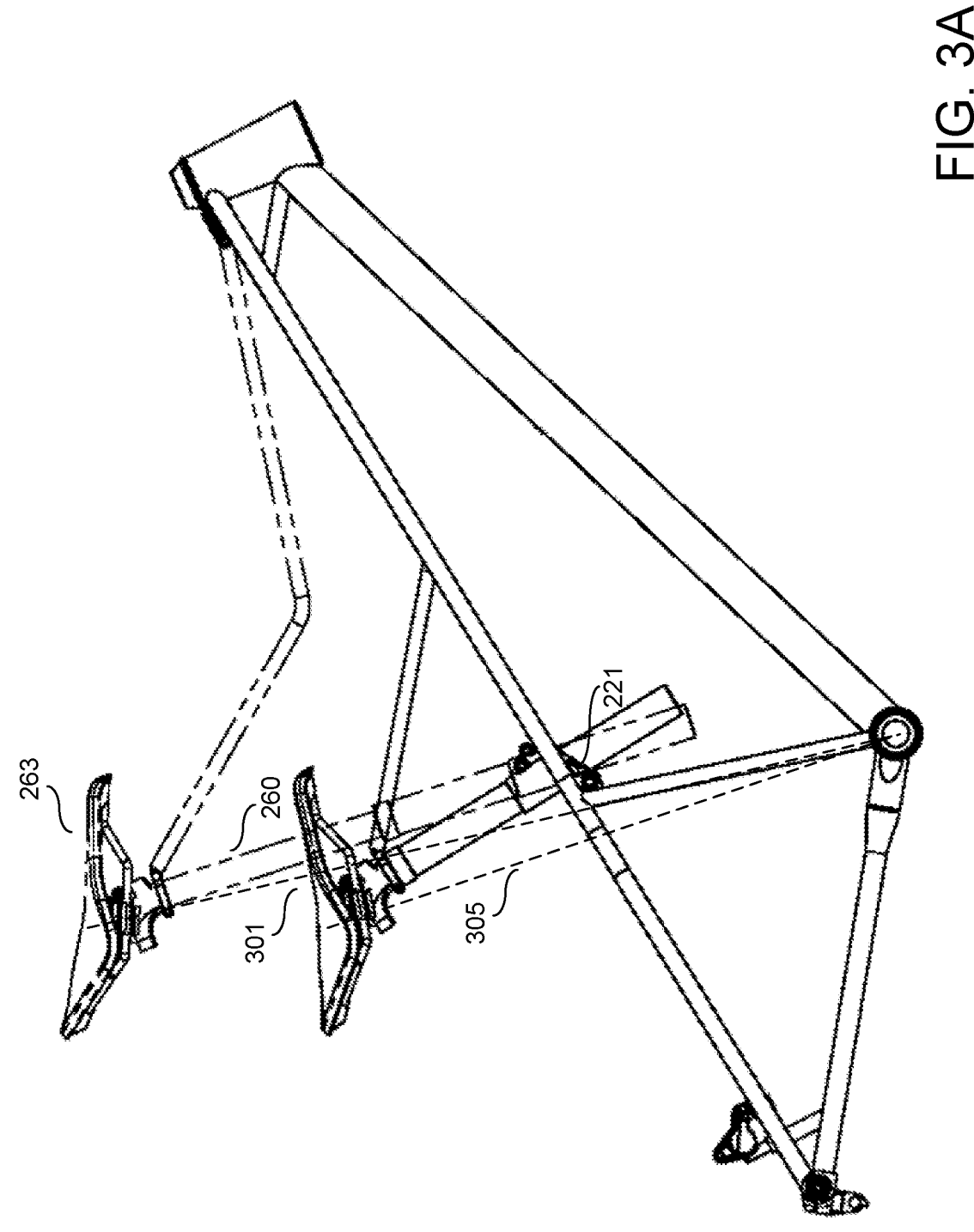
FIGS. 3A-3D illustrate aspects of the kinematics of an example bicycle frame according to some embodiments of this disclosure.

Referring to the illustrative example of FIG. 3A, frame 200 is shown with telescoping seat post assembly 260 is a fully compressed position (shown in solid lines) and in a fully extended position (shown in dotted lines). As shown in the FIG. 3A, because the upper portion of telescoping seat post assembly 260 is pivotably connected to first fore pivot assembly 231 through tension bar 251, saddle 263 does not move linearly backwards in response to the extension of telescoping seat post assembly. Rather, extension of telescoping seat post assembly 260 causes telescoping seat post assembly 260 to pivot clockwise about aft pivot assembly 221 in response. As shown in FIG. 3A, the rotation of telescoping seat post assembly 260 as it extends has at least the following effects on the geometry of frame 200. First, the effective seat tube angle 301 when telescoping seat post assembly 260 is fully extended is greater (also referred to as "steeper") than the effective seat tube angle 305 when telescoping seat post assembly 260 is fully compressed. In the illustrative example of FIG. 3A, the difference between seat tube is approximately 10 degrees, wherein the effective seat tube angle 301 is about 70 degrees, and effective seat tube angle 305 is about 69 degrees. Depending on the geometry and range of telescoping seat post assembly 260, the total difference in effective seat tube angle may be greater or smaller. In the example of FIG. 3A, saddle 263 occupies substantially the same reach point throughout the travel of telescoping seat post assembly 260. However, as discussed herein, in certain embodiments, the kinematics of the effective seat tube angle in response to actuation of the dropper may be tuned such that, saddle 263 occupies a more forward (i.e., closer to the reach point of the head tube) reach point when telescoping seat post assembly 260 is fully extended than when compressed.

Figures 3B, 3C:
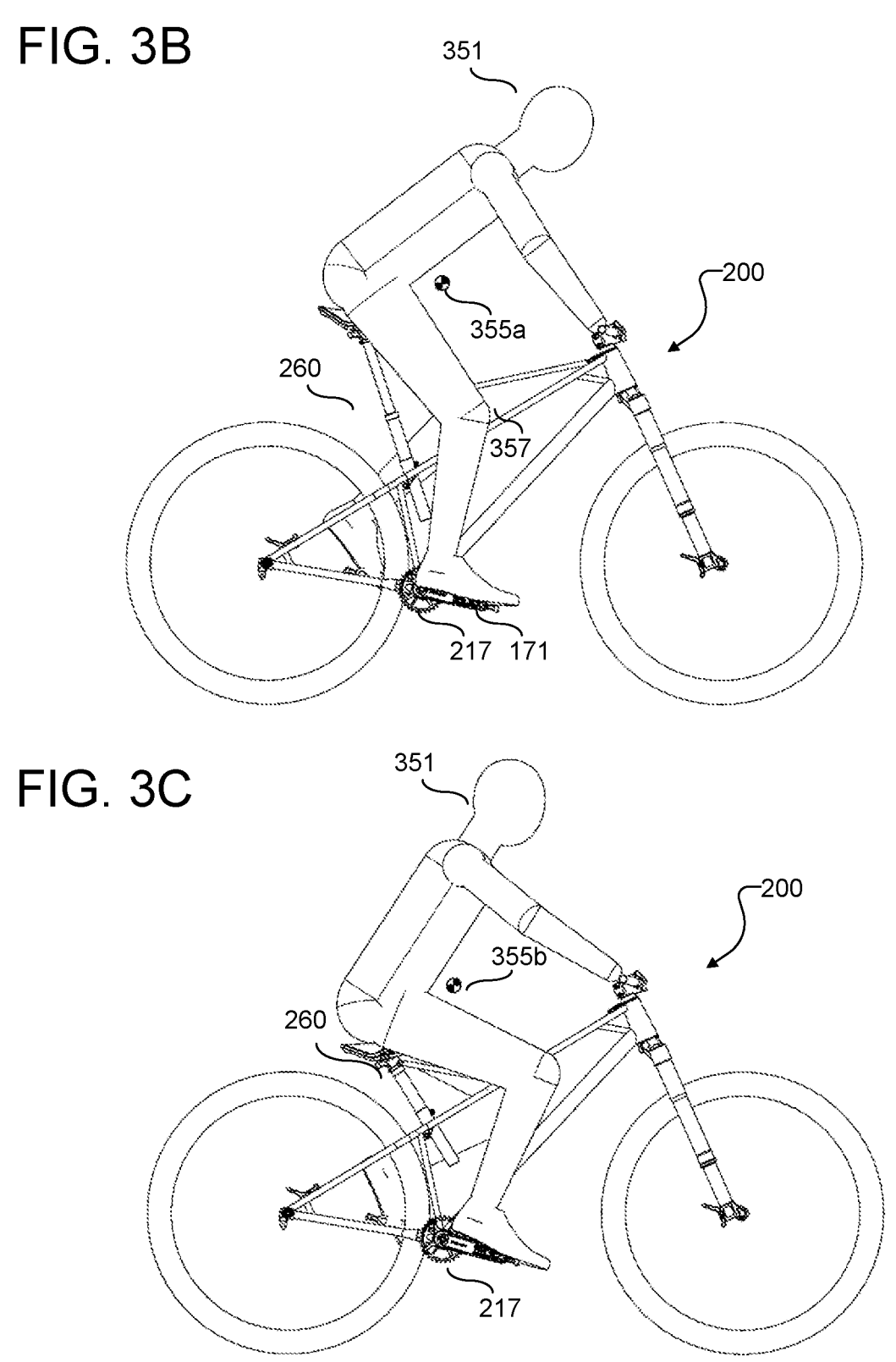
Figure 3D:
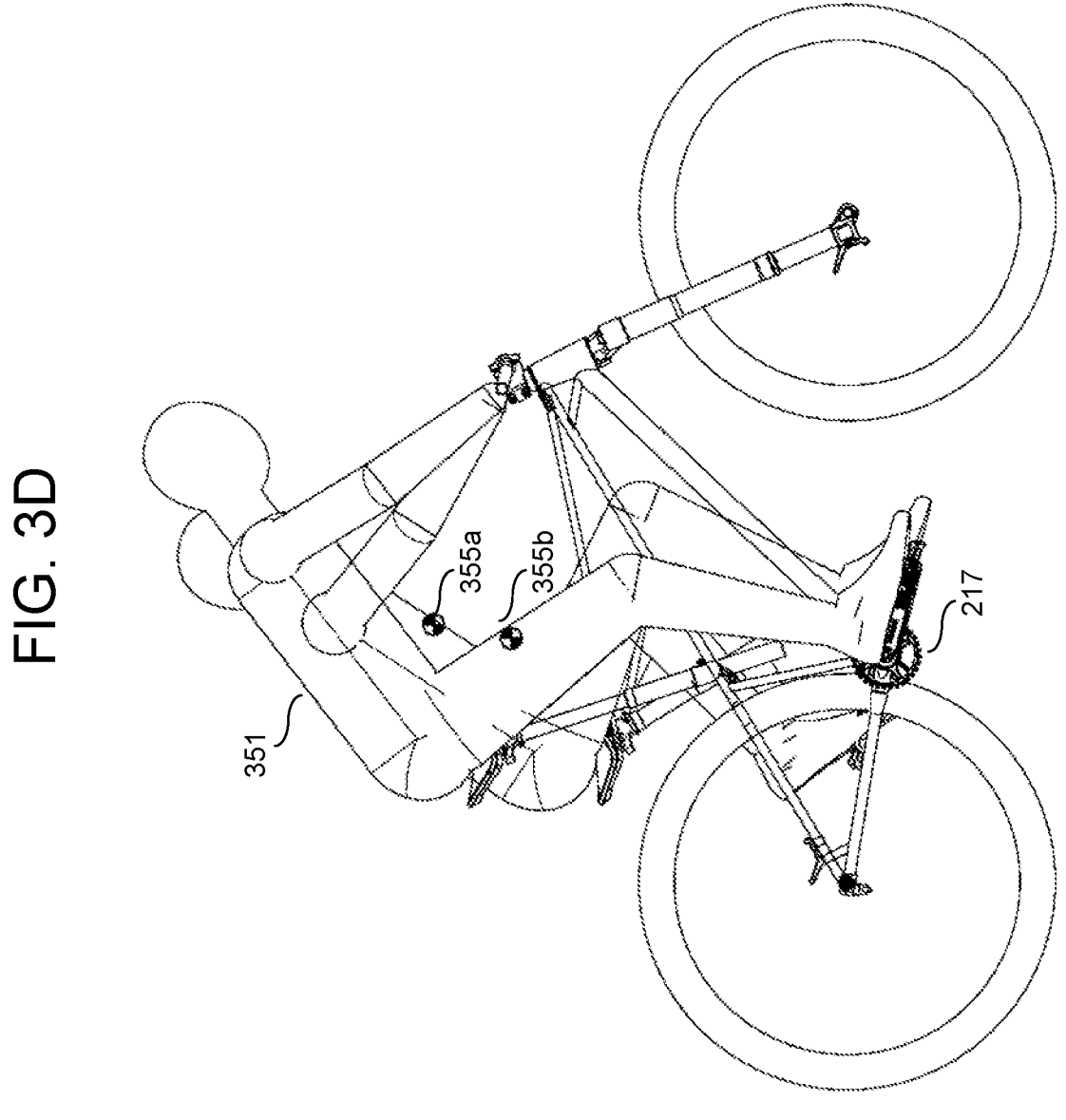

FIGS. 3B-3D further illustrate aspects of the biomechanical advantages provided by certain embodiments according to this disclosure. Referring to the illustrative example of FIG. 3B, an example frame 200 according to various embodiments of this disclosure is shown built up as a complete bicycle, upon which a rider 351 is positioned in a seated pedaling position. In the example of FIG. 3B, rider 351's center of mass occupies a first location 355a, which is situated along a substantially vertical line relative to bottom bracket shell 215. Similarly, when telescoping seat post assembly 260 is fully extended, rider 351's knee 357 is situated along a substantially vertical line relative to pedal spindle 171. From a biomechanical standpoint, rider 351 is in an optimum position for seated cranking at high power. In other words, with telescoping seat post assembly 260, the effective seat tube angle of frame 200 substantially mimics the effective seat tube angle provided by a cross-country mountain bike or a road bike, thereby facilitating efficient power transfer through pedaling.

FIG. 3C illustrates aspects of the weight distribution of the bicycle comprising frame 200 and rider 351 when telescoping seat post assembly 260 is fully compressed. As shown in FIG. 3A, in certain embodiments according to this disclosure, compression of telescoping seat post assembly 260 causes the effective seat tube angle of frame 200 to decrease or slacken. By relaxing the effective seat tube angle of frame 200 in response to compressing telescoping seat tube assembly 260, the tendency of the saddle of a "normal" frame with a seat tube maintained at a consistent angle relative to the head tube to move forward as it moves down is arrested. As shown in the example of FIG. 3C, even when telescoping seat post assembly 260 is fully compressed, rider 351's center of mass occupies a second location 355b, which, like first location 355a, is vertically aligned with bottom bracket shell 215. In other words, in addition to ensuring correct knee position relative to the pedal spindle when telescoping seat post assembly 260 is at the top of its travel, certain embodiments according to this disclosure also rider 351's center of mass over bottom bracket shell 215 throughout the travel of the dropper post.

FIG. 3D illustrates a superposition of FIGS. 3B and 3C to further illustrate how, the change in effective seat tube angle across the travel of telescoping seat post assembly 260. As shown in FIG. 3D, the fore-aft difference between first location 355a and second location 355b is relatively minimal, and rider 351's center of mass remains centered over bottom bracket shell 215 throughout the travel of telescoping seat post assembly 260, thereby completely or substantially eliminating the issues of a rider being either too far back and/or too far forward at different saddle heights.

Figure 4:
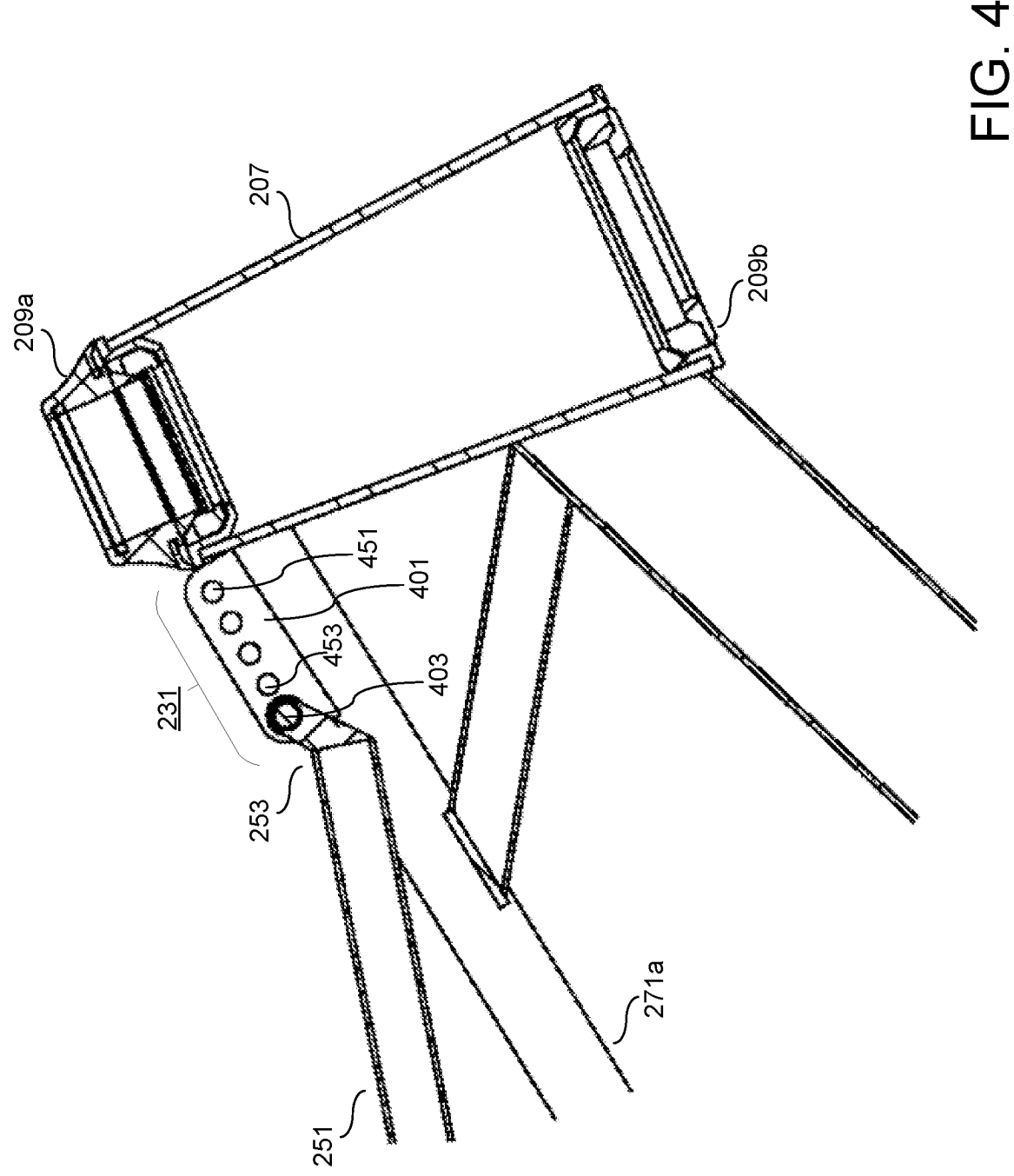
FIG. 4 illustrates an example of a fore pivot assembly according to certain embodiments of this disclosure.

FIG. 4 illustrates a detailed partial cutaway view of an example of a first fore pivot assembly 231 according to various embodiments of this disclosure. Referring to the illustrative example of FIG. 4, in some embodiments, first fore pivot assembly 231 comprises a section of material (for example, steel, aluminum, titanium or carbon fiber) attached to a top tube assembly (for example, to upper portions of first top stay 271a and second top stay 271b (not shown in FIG. 4) proximate to head tube 207. According to various embodiments, an upper headset bearing 209a is pressed into a first end of head tube 207, and a lower headset bearing 209*b* is pressed into a second end of head tube 207.

According to various embodiments, first fore pivot assembly 231 comprises two or more vertical members (for example, vertical member 401) with one or more pairs of opposing through holes (for example, holes 451 and 453) which define one or more devises for retaining a clevis pin 403 passing through one or more through-holes of a clevis hook at second end 253 of tension bar 251. In some embodiments, by providing a plurality of pivot points at first fore pivot assembly 231, the kinematics of the change in effective seat tube angle as telescoping seat post assembly 260 may be fine-tuned by slightly changing the location at which second end 253 of tension bar 251 pivots. Alternatively, or additionally, tension bar 251 may telescope or have a threaded component which allows the length of tension bar 251 to be adjusted for fine tuning of the seat post kinematics. The example of FIG. 4 is intended to illustrate, rather than limit, embodiments according to the disclosure and other embodiments are possible, and within the contemplated scope of this disclosure. For example, in some embodiments, the clevis structure could be provided on tension bar 251 and a component with a through hole could be provided on the frame.

Figure 5:
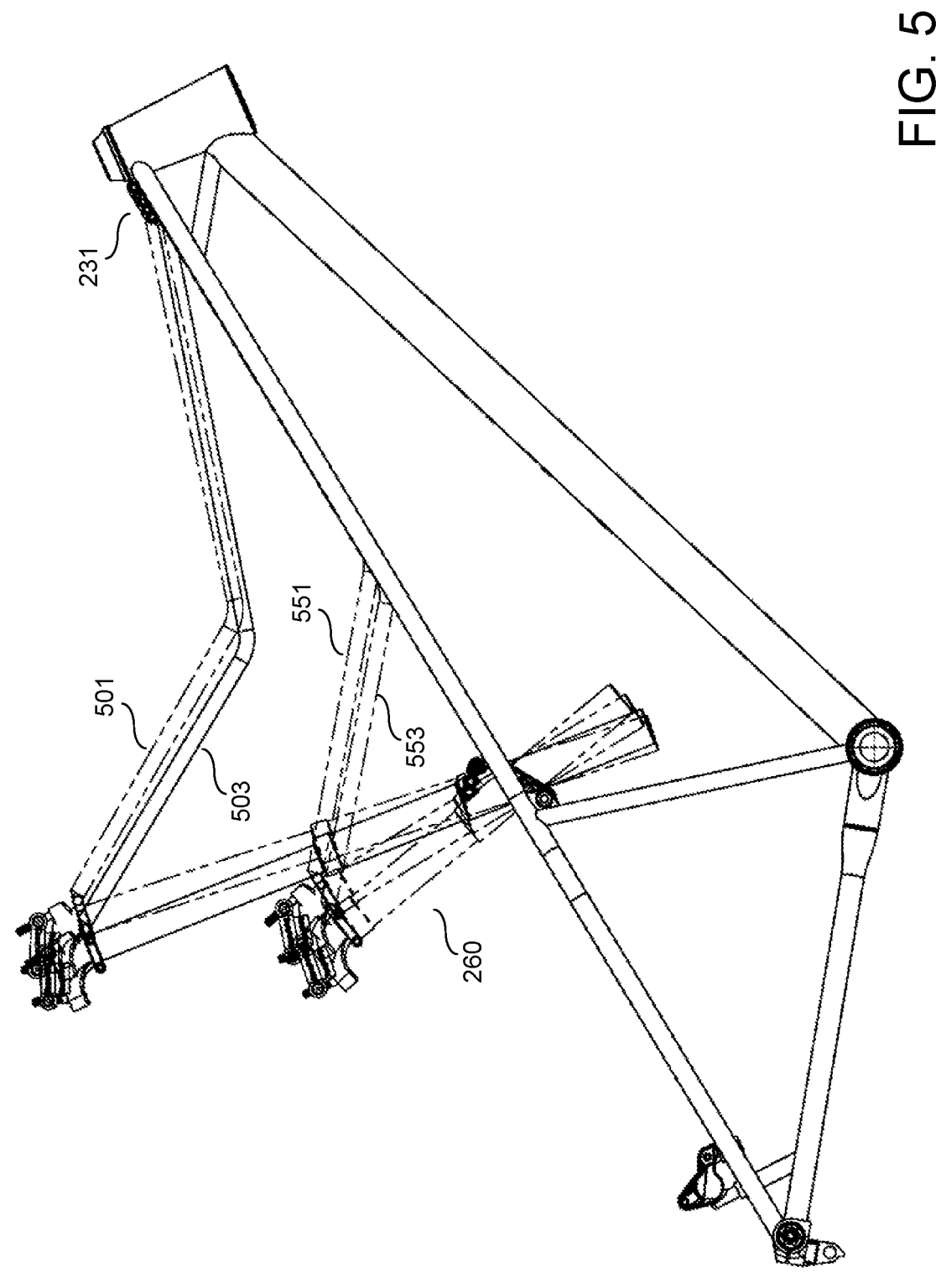
FIG. 5 illustrates aspects of fine tuning of the kinematics of an example bicycle frame according to various embodiments of this disclosure.

FIG. 5 illustrates an example of how in certain embodiments according to the present disclosure, moving the pivot point at which at which second end 253 of tension bar 251 connects to first fore pivot assembly 231 and/or changing the length of tension bar 251 effects the seat post kinematics.

Referring to the illustrative example of FIG. 5, a superposition showing the relative positions of tension bar 251 and telescoping seat post assembly in four configurations of frame 200 is provided in the figure. At first position 501, tension bar 251 is pivotably connected to first fore pivot assembly 231 at a pivot point (for example, hole 451 in FIG. 4) closest to upper bearing 209*a* of headset 209, and telescoping seat post assembly 260 is fully extended. At second position 503, tension bar 251 is pivotably connected to first fore pivot assembly 231 at a pivot point (for example, hole 453 in FIG. 4) aft of upper bearing 209*a* of headset 209. As shown in FIG. 5, using the more forward pivot point (for example, hole 451 in FIG. 4) results in a slightly steeper effective seat tube angle when telescoping seat post assembly 260 is fully extended.

At third position 551, tension bar 251 is pivotably connected to first fore pivot assembly 231 at the same pivot point as first position 501, only this time, telescoping seat post assembly 260 is fully compressed. Further, at fourth position 553, tension bar is pivotably connected to first fore pivot assembly 231 at the same pivot point as second position 503. As shown in FIG. 5, using the more forward pivot point (for example, hole 451 in FIG. 4) results in a slightly steeper effective seat tube angle when telescoping seat post assembly 260 is fully compressed. In this way, certain embodiments according to the present disclosure provide a level of micro-adjustment not present in conventional framesets in which the seat post is locked at a single angle relative to the head tube.

Figure 6:
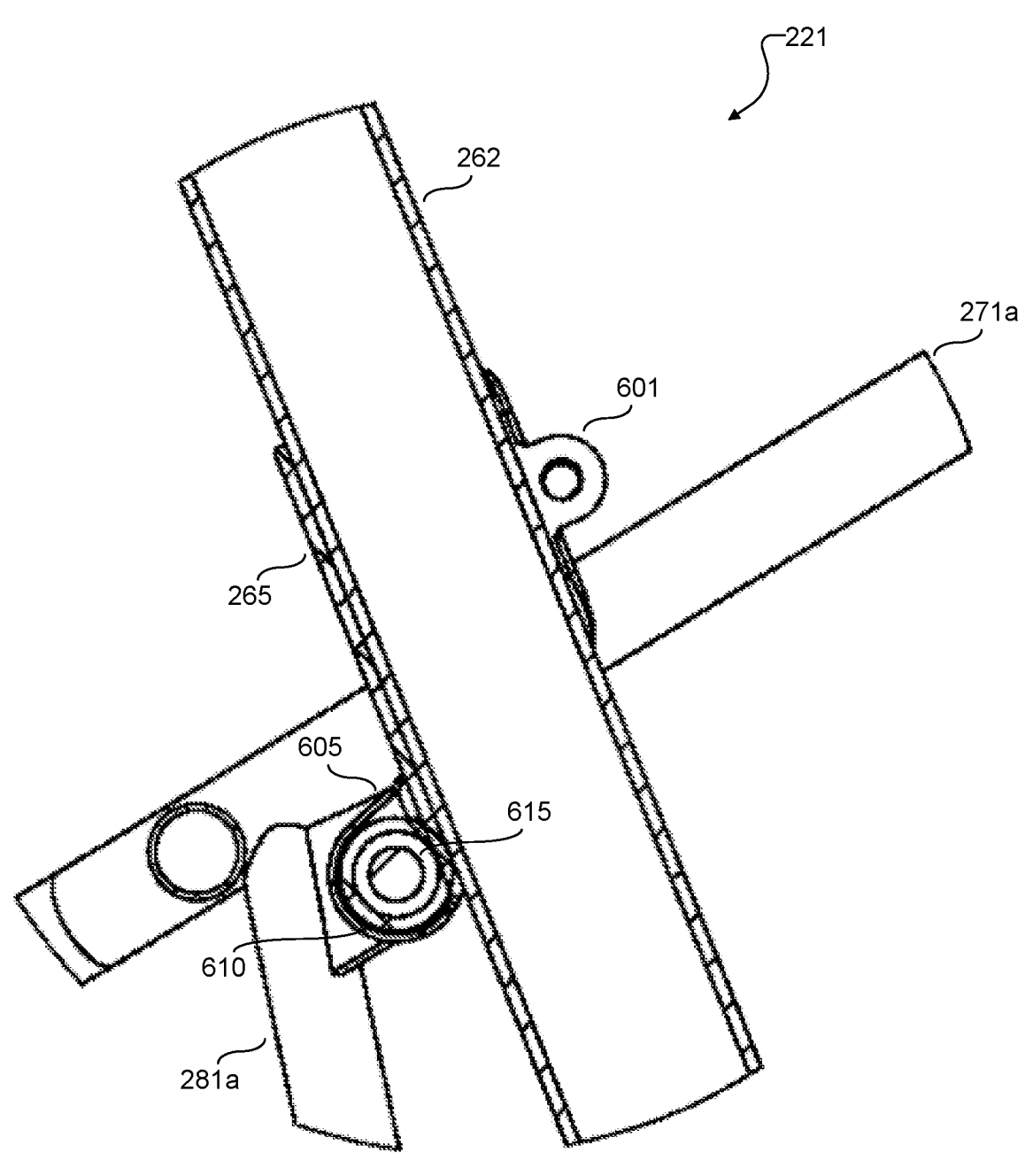
FIG. 6 illustrates an example of an aft pivot assembly according to various embodiments of this disclosure.

FIG. 6 illustrates a partial cutaway view of an example of an aft pivot assembly 221 according to various embodiments of this disclosure.

Referring to the non-limiting example of FIG. 6, in certain embodiments, aft pivot assembly 221 comprises a retaining tube 265, which is a hollow section of material (for example, steel, aluminum, carbon fiber or titanium) with an interior diameter sized to fit an exterior diameter of lower portion 262 of telescoping seat post assembly 260. In certain embodiments, retaining tube 265 may have an interior diameter proportioned to fit a seat post having a standard diameter (for example, 27.2, 30.9 or 31.6 mm). According to various embodiments, retaining tube 265 further comprises one or more clamps 601 which slightly compress retaining tube 265 to hold lower portion 262 of telescoping seat post assembly 260 in a fixed position relative to retaining tube 265. Further, in certain embodiments according to this disclosure, aft pivot assembly 221 further comprises an axle hanger 605 connected to retaining tube 265. The axle hanger comprises a section of material protruding from retaining tube 265 surrounding an axle 615, wherein axle 615 connects to a set of bushings or bearings at one or more fixed points on frame 200. Depending on embodiments, axle 615 may be integral to axle hanger 605 (akin to the axle on the hanger of a roller skate or skateboard truck) or may be removable.

As noted elsewhere in this disclosure, aft pivot assembly 221 comprises one, non-limiting example of an aft pivot assembly according to embodiments of this disclosure. Other embodiments of a structure permitting a telescoping seat post assembly 260 to pivot and resist the tendency of the effective seat tube angle of a frame during extension of a dropper seat post are possible and within the contemplated scope of this disclosure.

Figure 7:
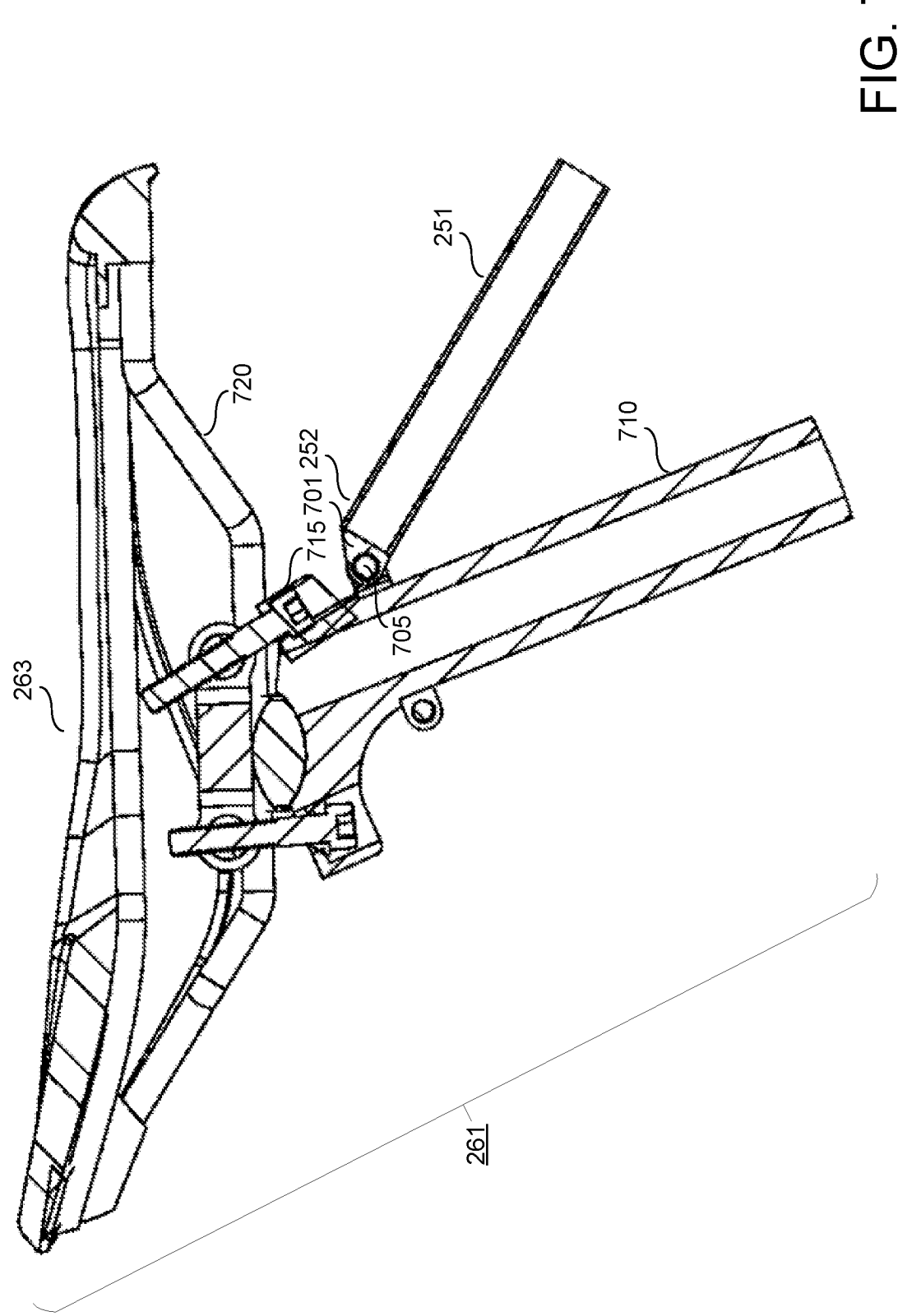
FIG. 7 illustrates an example of a pivotable connection between an end of a tension bar and an upper portion of a telescoping seat post assembly according to some embodiments of this disclosure.

FIG. 7 illustrates, in detailed cutaway view, an example of a pivotable connection between a first end 252 of a tension bar 251 and an upper portion 261 of a telescoping seat post assembly, according to various to embodiments of this disclosure.

Referring to the explanatory example of FIG. 7, in this example, first end 252 comprises a clevis 701, and seat post 710 of upper portion 261 of the telescoping seat post has a boss 705 with a through hole. In this non-limiting example, first end 252 pivotably connects to upper portion 261 of the telescoping seat post assembly through a clevis pin passing through both clevis 701 and boss 705. In certain embodiments, first end 252 may be pivotably connected to a portion of seat clamp 715, or alternatively, to saddle rails 720.

The example of a pivotable connection between first end 252 and upper portion 261 of telescoping seat post assembly 260 is for illustration only, and other embodiments of a pivoting connection between tension bar 251 and upper portion 261 are within the contemplated scope of this disclosure. For example, in some embodiments, instead of a rotational pivot, a flexible section of material may connect tension bar 251 and upper portion 261.

Figure 8A:
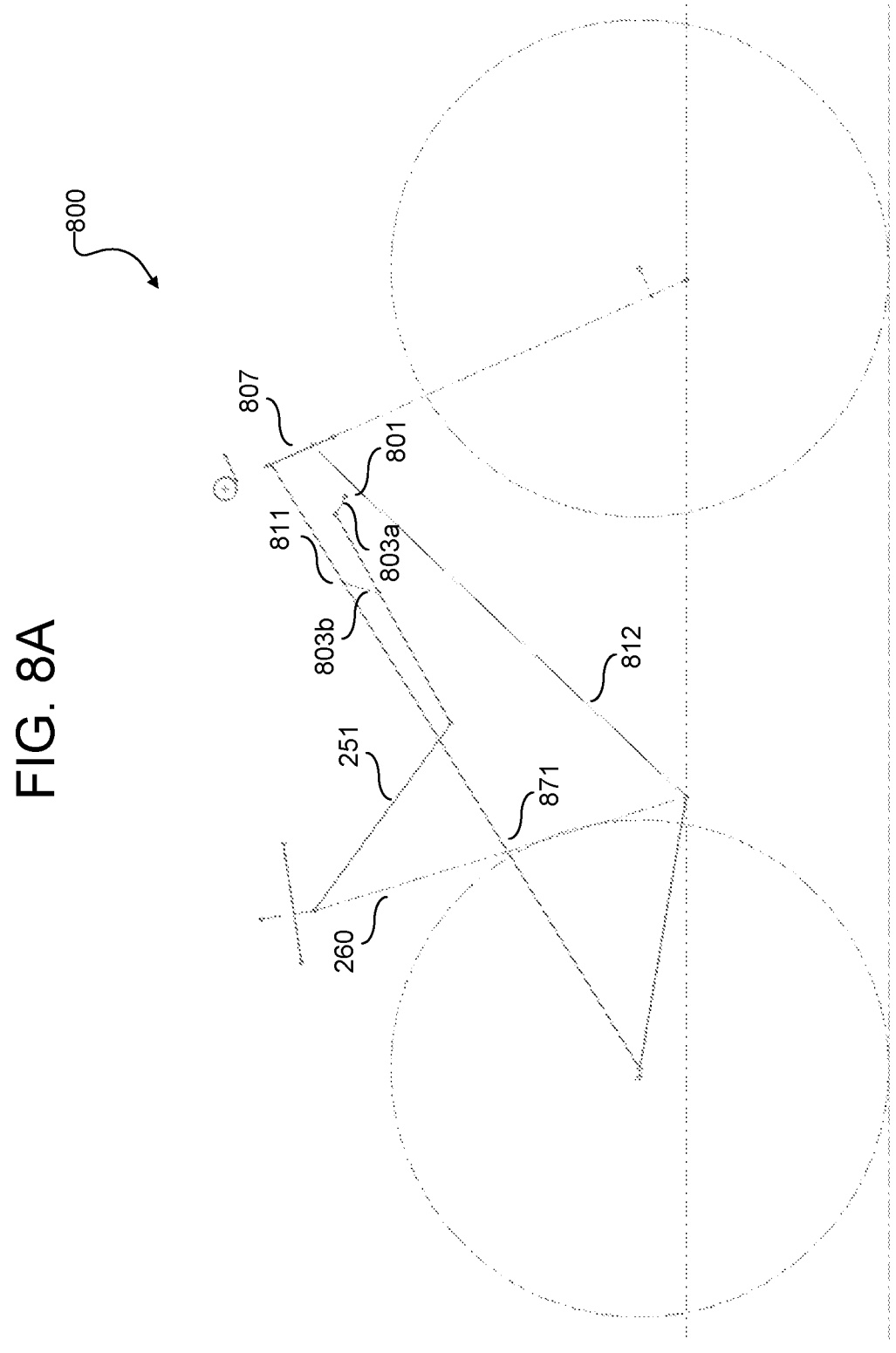
FIGS. 8A and 8B illustrate examples of frames incorporating multiple fore pivot assemblies according to certain embodiments of this disclosure.
Figure 8B:
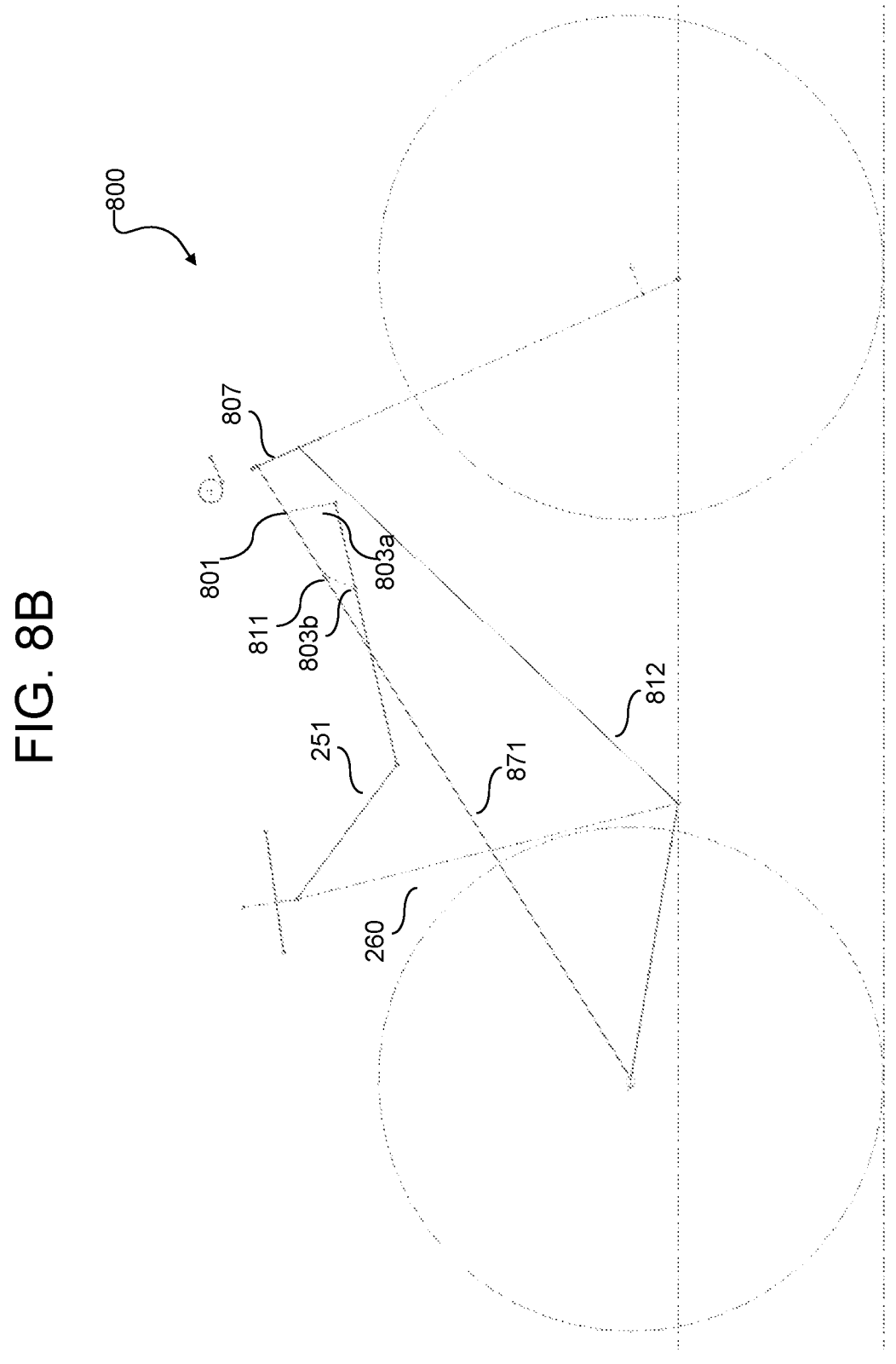

FIGS. 8A and 8B illustrate two examples of frames according to various embodiments of this disclosure. For convenience of cross-reference, elements shown in FIGS. 8A and 8B common to other figures of this disclosure are numbered similarly.

While embodiments according to this disclosure have thus far been described with reference to examples comprising a single fore pivot assembly (for example, first fore pivot assembly 231 in FIG. 2A), the present disclosure is not so limited. Embodiments according to the present disclosure encompass embodiments wherein tension bar 251 is pivotably connected to frame the frame at multiple points. By employing multiple pivoting connection points, the kinematics of the change in effective seat tube angle can be made more or less progressive than with a single pivot point. As used in this disclosure, the expression "progressive" encompasses the rate of change of a parameter (for example, effective seat tube angle) changing at a greater rate per increment of travel of a telescoping seat post varying across the travel of the telescoping seat post.

Referring to the non-limiting example of FIG. 8A, a tension bar 251 is pivotably connected to frame 800 through a first fore pivot assembly 801 and a second fore pivot assembly 811. In this example, first fore pivot assembly 801 is situated at a reach point that is closer to the reach point of head tube 807 than second fore pivot assembly 811. In the examples of FIGS. 8A and 8*b*, both first fore pivot assembly 801 comprise a linkage bar (for example, first linkage bar 803*a* and second linkage bar 803*b*) pivotably connected at one end to frame 800, and at another end to tension bar 251.

In the example of FIG. 8A, first fore pivot assembly 801 is mounted on the downtube 812, while second fore pivot assembly 811 is mounted on top tube assembly 871. In the example of FIG. 8B, both first fore pivot assembly 801 and second fore pivot assembly 811 are mounted on top tube assembly 871.

By making the connection between tension bar 251 and frame 800 "double jointed" with multiple fore pivot assemblies, the instant center of rotation of tension bar 251 becomes dynamic and moves as telescoping seat post assembly 260 extends and contracts.

In the illustrative example of FIG. 8A, telescoping seat post assembly 260 is shown fully compressed, and the instant center of rotation of tension bar 251 is below top tube assembly 871. However, as telescoping seat post assembly 260 extends, first linkage bar 803*a* rotates counterclockwise (in the view shown in FIGS. 8A & 8B), and second linkage 803*b* rotates clockwise (again, in the perspective shown in FIGS. 8A and 8B).

In the illustrative example of FIG. 8B, telescoping seat post assembly 260 is shown fully compressed, and the instant center of rotation of tension bar 251 is below top tube assembly 871. As telescoping seat post assembly 260 extends, both first linkage bar 803*a* and second linkage 803*b* rotate clockwise (again, in the perspective shown in FIGS. 8A and 8B), causing the instant center of rotation of tension bar 251 to drop.

Figure 9B:
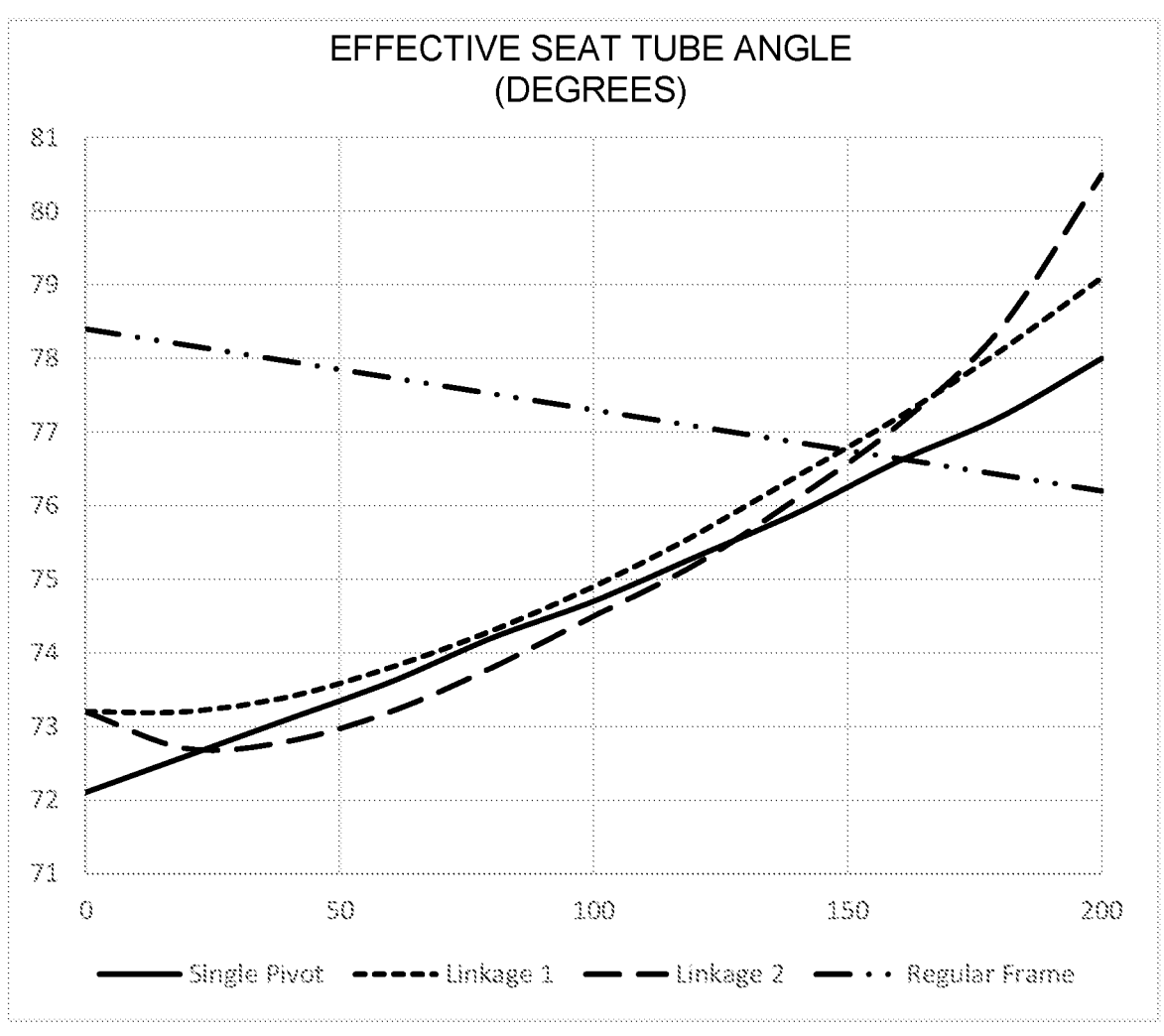

FIGS. 9A-9B illustrate aspects of the kinematics of certain embodiments according to this disclosure relative to the kinematics of a "regular" bicycle frame in which a telescoping seat post is retained at a fixed angle relative to the head tube.

Referring to the non-limiting example of FIG. 9A, the effective seat angle (expressed in degrees) of at different travel points of a long travel telescoping seat post assembly (for example, telescoping seat post assembly 260) are shown in the chart. First column 901 provides values of the effective seat tube angle as a function of seat post extension for a frame according to certain embodiments of this disclosure having a single fore pivot assembly (for example, frame 200 in FIG. 2A). Second column 903 provides values of the effective seat tube angle as a function of seat post extension for a first embodiment of a frame having two first fore pivot assemblies connected to the tension bar through linkages (for example, frame 800 in FIG. 8B). Third column 905 provides values of the effective seat tube angle as a function of seat post extension for a second embodiment of a frame having two first fore pivot assemblies connected to the tension bar through linkages (for example, frame 800 in FIG. 8A). Fourth column 907 provides values of the effective seat tube angle as a function of seat post extension for a "regular" frame, in which the telescoping seat post is maintained at a fixed angle relative to the head tube. FIG. 9B comprises a plot of the values tabulated in FIG. 9A.

As shown in FIGS. 9A-9B, in embodiments according to the present disclosure, the effective seat tube angle increases as the seat post approaches full extension, and excluding slight variations near full compression, generally slackens as the telescoping seat post compresses. By contrast, in a "regular frame," the effective seat tube angle slackens as the seat post extends, effectively ensuring that, at some point in the seat post's travel, a seated rider's center of gravity will not be over the bottom bracket, or the rider's knee will not be over the pedal spindle at full extension. As shown in FIG. 9B, the progressiveness with which the effective seat angle steepens as a function of seat post extension can be tuned by opting for different pivot designs according to this disclosure. For example, embodiments according to this disclosure utilizing a single fore pivot assembly offer a generally linear increase in effective seat post angle with dropper extension, while double pivot designs (shown in FIG. 9B as "Linkage 1" and "Linkage 2") offer more progressive kinematics. Depending on pivot placement and number of fore pivot assemblies utilized, the reach point of the bicycle's saddle can move forward relative to the reach point of the bottom bracket as the seat post approaches full extension.

Examples of bicycle frames according to this disclosure include bicycle frames comprising a front triangle comprising a head tube and a bottom bracket shell, a tension bar comprising a first end and a second end, wherein the first end of the tension bar is pivotably connected to an upper portion of a telescoping seat post assembly, a first fore pivot assembly at a first reach point, wherein the first reach point is between a reach point of the bottom bracket shell and a reach point of the head tube, and wherein the first fore pivot assembly is pivotably connected to the second end of the tension bar and an aft pivot assembly at a second reach point. Examples of bicycle frames according to this disclosure include bicycle frames the second reach point is closer to the reach point of the bottom bracket shell than the first reach point, and wherein the aft pivot assembly is pivotably connected to a lower portion of the telescoping seat post assembly.

Examples of bicycle frames according to this disclosure include bicycle frames, comprising a top tube assembly comprising a first end and a second end, wherein the first end of the top tube assembly is connected to the head tube, and wherein the second end of the top tube assembly comprises a portion in which a centerline of the frame is exposed proximate to the aft pivot assembly.

Examples of bicycle frames according to this disclosure include bicycle frames comprising a seat tube assembly comprising a first end and a second end, wherein the first end of the seat tube assembly is connected to the bottom bracket shell, and wherein the second end of the seat tube assembly comprises a portion in which a centerline of the frame is exposed proximate to the aft pivot assembly.

Examples of bicycle frames according to this disclosure include bicycle frames comprising a top tube assembly connected to the head tube, wherein the first fore pivot assembly is connected to the top tube assembly proximate to the head tube.

Examples of bicycle frames according to this disclosure include bicycle frames wherein the tension bar comprises a bend between the first end and the second end.

Examples of bicycle frames according to this disclosure include bicycle frames wherein the lower portion of the telescoping seat post assembly comprises a seat clamp.

Examples of bicycle frames according to this disclosure include bicycle frames wherein when the telescoping seat post assembly is moved from a compressed first position to an extended second position, the telescoping seat post assembly pivots from a first effective seat tube angle to a second effective seat tube angle, and wherein the second effective seat tube angle is closer to vertical than the first effective seat tube angle.

Examples of bicycle frames according to this disclosure include bicycle frames wherein when the telescoping seat post assembly is at the compressed first position, a saddle is at a first seat reach point, wherein when the telescoping seat post assembly is at the extended second position, the saddle is at a second seat reach point, wherein the second seat reach point is closer to the head tube than the first seat reach point.

Examples of bicycle frames according to this disclosure include bicycle frames comprising a second fore pivot assembly at a third reach point, wherein the third reach point is between a reach point of the bottom bracket shell and the first reach point, a first linkage pivotably connecting the first end of the tension bar to the first fore pivot assembly, and a second linkage pivotably connecting the second fore pivot assembly to an attachment point on the tension bar.

Examples of bicycle frames according to this disclosure include bicycle frames comprising a top tube assembly connected to the head tube, wherein the second fore pivot assembly is connected to the top tube assembly.

Examples of bicycle frames according to this disclosure include bicycle frames comprising a top tube assembly connected to the head tube, wherein first fore pivot assembly is connected to the top tube assembly.

Examples of bicycle frames according to this disclosure include bicycle frames comprising a down tube assembly, wherein the first fore pivot assembly is connected to the down tube assembly.

Examples of bicycle frames according to this disclosure include bicycle frames comprising a first top stay connected at a first end to the head tube and at a second end to a first rear dropout and a second top stay connected at a first end to the head tube and at a second end to a second rear dropout, wherein the aft pivot assembly is connected to both the first top stay and the second top stay.

Examples of bicycle frames according to this disclosure include bicycle frames wherein a length of the tension bar is adjustable.

Examples of bicycle frames according to this disclosure include bicycle frames wherein a pivot point of the first fore pivot assembly is adjustable.

Examples of bicycle frames according to this disclosure include bicycle frames wherein an effective seat tube angle of the telescoping seat post assembly increases as the telescoping seat post assembly extends.

Examples of bicycle frames according to this disclosure include bicycle frames wherein the effective seat tube angle of the telescoping seat post assembly increases substantially linearly as the telescoping seat post assembly extends.

Examples of bicycle frames according to this disclosure include bicycle frames wherein the effective seat tube angle of the telescoping seat post assembly increases progressively as the telescoping seat post assembly extends in length.

Examples of bicycle frames according to this disclosure include bicycle frames wherein the aft pivot assembly comprises a retaining tube sized to fit the second portion of the telescoping seat post assembly, a clamp for compressing the retaining tube around the second portion of the telescoping seat post assembly and an axle hanger connected to the retaining tube.

This written description uses examples to disclose embodiments and to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any sub combination. Further, references to values stated in ranges include each and every value within that range.

What is claimed is:

1. A bicycle frame comprising:
   a front triangle comprising a head tube and a bottom bracket shell;
   a tension bar comprising a first end, a second end, and one or more bends between the first end and the second end, wherein the first end of the tension bar is pivotably connected to an upper portion of a telescoping seat post assembly, the telescoping seat post assembly having a lower portion and the upper portion, the lower portion comprising a hollow section of material, the upper portion comprising a second hollow section of material proportioned to slide along an interior surface or exterior surface of the lower portion;
   a first fore pivot assembly at a first reach point, wherein the first reach point is between a reach point of the bottom bracket shell and a reach point of the head tube, and wherein the first fore pivot assembly is pivotably connected to the second end of the tension bar; and
   an aft pivot assembly at a second reach point, wherein the second reach point is closer to the reach point of the bottom bracket shell than the first reach point, and wherein the aft pivot assembly is pivotably connected to the lower portion of the telescoping seat post assembly.

2. The bicycle frame of claim 1, further comprising: a top tube assembly comprising a first end and a second end, wherein the first end of the top tube assembly is connected to the head tube, and wherein the second end of the top tube assembly comprises a portion in which a centerline of the frame is exposed proximate to the aft pivot assembly.

3. The bicycle frame of claim 1, further comprising: a seat tube assembly comprising a first end and a second end, wherein the first end of the seat tube assembly is connected to the bottom bracket shell, and wherein the second end of the seat tube assembly comprises a portion in which a centerline of the frame is exposed proximate to the aft pivot assembly.

4. The bicycle frame of claim 1, further comprising a top tube assembly connected to the head tube, wherein the first fore pivot assembly is connected to the top tube assembly proximate to the head tube.

5. The bicycle frame of claim 1, wherein the lower portion of the telescoping seat post assembly comprises a seat clamp.

6. The bicycle frame of claim 1, wherein when the telescoping seat post assembly is moved from a compressed first position to an extended second position, the telescoping seat post assembly pivots from a first effective seat tube angle to a second effective seat tube angle, and wherein the second effective seat tube angle is closer to vertical than the first effective seat tube angle.

7. The bicycle frame of claim 6, wherein when the telescoping seat post assembly is at the compressed first position, a saddle is at a first seat reach point, wherein when the telescoping seat post assembly is at the extended second position, the saddle is at a second seat reach point, wherein the second seat reach point is closer to the head tube than the first seat reach point.

8. The bicycle frame of claim 1, further comprising: a second fore pivot assembly at a third reach point, wherein the third reach point is between a reach point of the bottom bracket shell and the first reach point; a first linkage pivotably connecting the first end of the tension bar to the first fore pivot assembly; and a second linkage pivotably connecting the second fore pivot assembly to an attachment point on the tension bar.

9. The bicycle frame of claim 8, further comprising: a top tube assembly connected to the head tube, wherein the second fore pivot assembly is connected to the top tube assembly.

10. The bicycle frame of claim 8, further comprising: a top tube assembly connected to the head tube, wherein first fore pivot assembly is connected to the top tube assembly.

11. The bicycle frame of claim 8, further comprising: a down tube assembly, wherein the first fore pivot assembly is connected to the down tube assembly.

12. The bicycle frame of claim 1, further comprising: a first top stay connected at a first end to the head tube and at a second end to a first rear dropout; and a second top stay connected at a first end to the head tube and at a second end to a second rear dropout, wherein the aft pivot assembly is connected to both the first top stay and the second top stay.

13. The bicycle frame of claim 1, wherein a length of the tension bar is adjustable.

14. The bicycle frame of claim 1, wherein a pivot point of the first fore pivot assembly is adjustable.

15. The bicycle frame of claim 1, wherein an effective seat tube angle of the telescoping seat post assembly increases as the telescoping seat post assembly extends.

16. The bicycle frame of claim 15, wherein the effective seat tube angle of the telescoping seat post assembly increases substantially linearly as the telescoping seat post assembly extends.

17. The bicycle frame of claim 15, wherein the effective seat tube angle of the telescoping seat post assembly increases progressively as the telescoping seat post assembly extends in length.

18. The bicycle frame of claim 1, wherein the aft pivot assembly comprises:
a retaining tube sized to fit the lower portion of the telescoping seat post assembly;
a clamp for compressing the retaining tube around the lower portion of the telescoping seat post assembly; and
an axle hanger connected to the retaining tube.

19. A bicycle frame comprising:
a front triangle comprising a head tube and a bottom bracket shell,
a tension bar comprising a first end and a second end, wherein the first end of the tension bar is pivotably connected to an upper portion of a telescoping seat post assembly, the telescoping seat post assembly having a lower portion and the upper portion, the lower portion comprising a hollow section of material, the upper portion comprising a second hollow section of material proportioned to slide along an interior surface or exterior surface of the lower portion;
a first fore pivot assembly at a first reach point,
wherein the first reach point is between a reach point of the bottom bracket shell and a reach point of the head tube,
and wherein the first fore pivot assembly is pivotably connected to the second end of the tension bar; and
an aft pivot assembly at a second reach point,
wherein the second reach point is closer to the reach point of the bottom bracket shell than the first reach point, and
wherein the aft pivot assembly is pivotably connected to the lower portion of the telescoping seat post assembly.

20. The bicycle frame of claim 19, wherein the front triangle further comprises at least one structure that connects the head tube to the bottom bracket shell, wherein the at least one structure is directly connected to the head tube without a pivot and directly connected to the bottom bracket shell without a pivot.

21. The bicycle frame of claim 19, wherein the front triangle comprises a top structure and a down structure, wherein the top structure is directly connected to the head tube without a pivot, and wherein the down structure is directly connected to the head tube without a pivot.

22. The bicycle frame of claim 21, wherein the tension bar comprises one or more bends.

23. The bicycle frame of claim 19, wherein the second hollow section of material is proportioned to slide along an exterior surface of the lower portion.

\* \* \* \* \*